United States Patent
Cohen et al.

(10) Patent No.: US 9,738,522 B2
(45) Date of Patent: Aug. 22, 2017

(54) PRODUCTION OF AMMONIUM PHOSPHATES

(71) Applicant: EasyMining Sweden AB, Uppsala (SE)

(72) Inventors: Yariv Cohen, Uppsala (SE); Patrik Enfält, Uppsala (SE)

(73) Assignee: EASYMINING SWEDEN AB, Uppsala (SE)

( * ) Notice: Subject to any disclaimer, the term of this patent is extended or adjusted under 35 U.S.C. 154(b) by 242 days.

(21) Appl. No.: 14/409,131

(22) PCT Filed: Jun. 19, 2013

(86) PCT No.: PCT/SE2013/050736
§ 371 (c)(1),
(2) Date: Dec. 18, 2014

(87) PCT Pub. No.: WO2013/191639
PCT Pub. Date: Dec. 27, 2013

(65) Prior Publication Data
US 2015/0360946 A1    Dec. 17, 2015

(30) Foreign Application Priority Data

Jun. 21, 2012 (SE) .................... 1250666

(51) Int. Cl.
*C05B 7/00* (2006.01)
*C01B 25/28* (2006.01)
(Continued)

(52) U.S. Cl.
CPC .......... *C01B 25/462* (2013.01); *B01D 9/0013* (2013.01); *B01D 11/04* (2013.01);
(Continued)

(58) Field of Classification Search
None
See application file for complete search history.

(56) References Cited

U.S. PATENT DOCUMENTS

| 3,072,461 A | 1/1963 | Long et al. |
| 3,415,619 A | 12/1968 | Young |

(Continued)

FOREIGN PATENT DOCUMENTS

| CN | 1868865 A | 11/2006 |
| CN | 101679038 A | 3/2010 |

(Continued)

OTHER PUBLICATIONS

Search Report dated Sep. 2, 2015, from corresponding Chinese Application No. 201380032865.X.
Supplementary European Search Report dated Feb. 23, 2016.

*Primary Examiner* — Wayne Langel
(74) *Attorney, Agent, or Firm* — Porter Wright Morris & Arthur LLP

(57) ABSTRACT

An arrangement (100) for production of fully soluble, pure and well defined mono- or di-ammonium phosphates, comprises an extraction section (10), a stripping section (20) and end treatment arrangements (90). The extraction section performs a liquid-liquid extraction of phosphate between a feed liquid (1) comprising phosphoric acid and being essentially free from nitrate ions, and a solvent (5) having a solubility in water of less than 2%. The stripping section performs a liquid-liquid extraction of phosphate between solvent loaded with phosphate and a strip solution (4). The solvent depleted in phosphate is recirculated to the extraction section for further extraction of phosphate. The strip solution is an aqueous ammonium phosphate solution, wherein at least 80% of the ammonium phosphate is mono-ammonium phosphate and/or wherein the solvent is a water-immiscible alcohol. The end treatment arrangements comprise a source of ammonia (60), an adding arrangement (70), a cooling arrangement (50), a precipitate remover (40) and a recirculation system (80).

24 Claims, 8 Drawing Sheets

(51) Int. Cl.
- *B01J 19/24* (2006.01)
- *C01B 25/46* (2006.01)
- *B01D 11/04* (2006.01)
- *B01D 9/00* (2006.01)
- *C05B 11/10* (2006.01)

(52) U.S. Cl.
CPC ............... *B01J 19/24* (2013.01); *C01B 25/28* (2013.01); *C01B 25/461* (2013.01); *C05B 7/00* (2013.01); *C05B 11/10* (2013.01); *B01J 2219/00049* (2013.01); *B01J 2219/24* (2013.01)

(56) References Cited

U.S. PATENT DOCUMENTS

| | | | |
|---|---|---|---|
| 3,518,071 A | 6/1970 | Villiers-Fisher et al. | |
| 3,894,143 A | 7/1975 | Von Semel et al. | |
| 3,975,178 A | 8/1976 | McCullough et al. | |
| 4,024,225 A * | 5/1977 | Chiang | C01B 25/46 210/639 |
| 4,053,564 A * | 10/1977 | Bradford | C01B 25/238 423/112 |
| 4,082,836 A * | 4/1978 | Ore | C01B 25/238 423/321.2 |
| 4,112,118 A | 9/1978 | Cussons et al. | |
| 4,132,540 A * | 1/1979 | Edwards | C05B 7/00 423/309 |
| 4,152,402 A * | 5/1979 | Walters, Jr. | C01B 25/234 423/310 |
| 4,236,911 A * | 12/1980 | McCullough | C01B 25/463 423/310 |
| 4,311,681 A | 1/1982 | Chiang et al. | |
| 4,556,548 A * | 12/1985 | Gradl | C01B 25/01 423/157.2 |
| 4,596,703 A * | 6/1986 | Gradi | C01B 25/462 423/313 |
| 4,678,650 A | 7/1987 | Gradl et al. | |
| 4,751,066 A | 6/1988 | Hall et al. | |
| 4,781,905 A * | 11/1988 | Yu-Ming | C01B 25/461 423/309 |
| 8,658,117 B2 * | 2/2014 | Cohen | C01B 25/28 423/308 |
| 2010/0068113 A1 | 3/2010 | Cohen | |

FOREIGN PATENT DOCUMENTS

| | | |
|---|---|---|
| GB | 636035 A | 4/1950 |
| GB | 1128104 A | 9/1968 |
| GB | 1238188 A | 7/1971 |
| RU | 2205789 C1 | 10/2003 |
| SU | 424849 A1 | 4/1974 |
| SU | 424849 A | 10/1974 |
| WO | 2008/115121 A1 | 9/2008 |
| WO | 2010/138045 A1 | 12/2010 |

* cited by examiner

PRODUCTION OF AMMONIUM PHOSPHATES

TECHNICAL FIELD

The present invention relates in general to production of ammonium phosphates from phosphorus-containing solutions and in particular to production of ammonium phosphates from a feed liquid comprising phosphoric acid.

BACKGROUND

All water-soluble phosphate salts such as soluble fertilizers are derived from phosphoric acid. Phosphoric acid is produced commercially by either a 'wet' or a thermal process. Wet digestion of phosphate rock is the most common process. Thermal processing is energy intensive and therefore expensive. For that reason, quantities of acid produced thermally are much smaller and mainly used for production of industrial phosphates.

Phosphoric acid for fertilizer production is almost solely based on wet digestion of rock phosphate. The process is mainly based on dissolution of apatite with sulfuric acid. After dissolution of the rock, calcium sulfate (gypsum) and phosphoric acid are separated by filtration. To produce merchant-grade phosphoric acid, high acid concentrations are required and water is evaporated. Calcium sulfate exists in a number of different crystal forms depending on the prevailing conditions such as temperature, phosphorus concentration in the slurry, and level of free sulfate. Calcium sulfate is either precipitated as di-hydrate ($CaSO_4.2H_2O$) or as hemi-hydrate ($CaSO_4.½H_2O$). Phosphoric acid produced through this process is characterized by a relatively low purity.

For deriving ammonium phosphate salts, merchant-grade phosphoric acid, having a concentration of about 54% $P_2O_5$, is neutralized with ammonia to form either mono-ammonium phosphate (MAP) or di-ammonium phosphate (DAP) by controlling the ammonia-to-phosphoric acid mole ratio during the neutralization process. Ammonia is used in liquid or gaseous form. Liquid anhydrous ammonia is usually preferred since surplus heat from other systems in necessary for vaporizing liquid ammonia into a gaseous form.

The neutralization of merchant-grade phosphoric acid with ammonia is usually performed in several stages using several reaction vessels. The mole ratio of ammonia to phosphoric acid in the pre-reactor/s is normally held at a level which gives the maximum solubility for the slurry (between 1.4 and 1.45 for production of DAP and usually less than 1 for production of MAP). For operation control, the ammonia to phosphoric acid mole ratio is determined by monitoring the pH of the slurry. Excess heat of reaction is removed from the pre-neutralizer/s by adding water to the reactor/s. Evaporation of the water cools the slurry. As the mole ratio of ammonia to phosphoric acid is increased over 1, un-reacted ammonia escapes from the reactor and the gaseous vapors released must be scrubbed with an acid.

The slurry from the pre-neutralization reactor/s which usually contain between 16 to 23% water is usually fed into an ammoniator-granulator to complete the addition of ammonia for the desired product. Completion of the neutralization and additional evaporation of water results in solid particles being formed. It is necessary to recover the un-reacted ammonia from the gaseous vapors by scrubbing with an acid. Thereafter, the solid ammonium phosphates are usually dried in a separate reactor to reduce moisture content. Loss of ammonia from the dryer is usually recovered by scrubbing with acid. The solid ammonium phosphates are normally cooled by passing air through a cooling reactor.

For several applications such as fertigation, i.e. the application of water-soluble fertilizers in the irrigation water, and foliar fertilization, i.e. spraying fertilizers on leaves, there is a need for fully-soluble ammonium phosphates to avoid clogging of the fertigation equipment by non-dissolved solids. Wet-process phosphoric acid contains a substantial amount of impurities such as iron, aluminum, calcium, magnesium, cadmium, etc. which form water-insoluble solids upon neutralization with ammonia and thus fertilizer-grade ammonium phosphates are not completely water-soluble. Therefore, fully-soluble P fertilizers for fertigation purposes must be specially produced from purified phosphoric acid which means additional processing.

The current technology for phosphoric acid purification is based on extraction of impure wet-process phosphoric acid into an organic solvent (ketones, tri-alkyl phosphates, alcohols, etc.) followed by back extraction with water forming a pure phosphoric acid but with a lower concentration, which is thereafter concentrated by water evaporation. Purified phosphoric acid is thereafter neutralized with ammonia forming fully-soluble ammonium phosphate products according to the procedure described above.

The disadvantages of the state-of-the art technologies for production of ammonium phosphates are numerous. The phosphoric acid as produced from the gypsum filter, in a dihydrate process, is not suitable for direct manufacture of ammonium phosphate salts. The acid must be further concentrated by water evaporation to a suitable phosphoric acid concentration (usually about 54% $P_2O_5$). Normally, concentration of phosphoric acid is done in three stages. The acid from the filter (28% $P_2O_5$) is evaporated to 40% $P_2O_5$ in a single stage vacuum evaporator. The acid is then clarified to remove precipitated solids and the clarified acid is then concentrated to 54% $P_2O_5$ in two stages. The inter-stage concentration is about 48% $P_2O_5$. The 54% $P_2O_5$ acid is used for ammonium phosphate production according to the procedure described above.

To concentrate acids through evaporation is a very energy-intensive process. The amount of steam required for concentrating phosphoric acid usually varies between 2.5-5 tons of steam per ton of phosphorus, depending on production conditions. If the phosphoric acid is purified by solvent extraction the energy demand is about 7 tons steam per ton of phosphorus. The energy demand for concentration of phosphoric acid is a major production cost. Expensive equipment such as steam distribution systems, evaporators, effluent gas scrubbers, condensation systems, cooling water systems, liquid effluent treatment systems and acid storage facilities are necessary for production of merchant-grade phosphoric acid. About 50 tons of cooling water is required in order to condense one ton of vapor. In a barometric condenser the vapor is directly contacted by the water and as a result impurities in the vapor contaminate the cooling water which results in large quantities of contaminated effluents. Furthermore, additional equipment is needed for the neutralization of phosphoric acid with ammonia in several stages, drying, cooling and scrubbing of ammonia from gaseous vapors. Production of ammonium phosphate of technical quality requires additional processing steps as described above.

U.S. Pat. No. 3,894,143 describes a process for obtaining crystallized ammonium phosphate from wet-process phosphoric acid and ammonia. The process consists of a) forming a mixture of aqueous phosphoric acid and acetone in which all components are miscible with water, b) precipitating impurities by addition of ammonia and separating the precipitated impurities to form a purified mixture, c) contacting the purified mixture with ammonia to produce ammonium phosphate crystals and a supernatant liquid, and d) separating the ammonium phosphate crystals from the supernatant liquid and distilling the supernatant to separate the acetone for recycling. The disadvantages of this method include distillation of large quantities of acetone, limited yield of ammonium phosphates, and production of large quantities of dilute aqueous ammonium phosphate effluents. A further main limitation of this procedure is the insufficient selectivity. Water miscible solvents are approaching the properties of water which results in that cationic and anionic contaminants are co-extracted to a large extent.

U.S. Pat. Nos. 3,975,178 and 4,236,911 are similar to U.S. Pat. No. 3,894,143 and consist of forming a mixture of aqueous phosphoric acid and acetone or methanol in which all components are miscible with water followed by addition of ammonia in order to precipitate impurities and thereafter ammonium phosphate. The disadvantages are similar to that reported for U.S. Pat. No. 3,894,143.

U.S. Pat. No. 4,132,540 describes a process for removing solvent from the raffinate of extracted phosphoric acid. Residual solvent is removed from the raffinate by addition of ammonium or alkali or alkaline earth metal cations in an atomic ratio to phosphorus of between 0.1:1 and 0.6:1.

U.S. Pat. No. 4,311,681 describes a process for separation of impurities such as silica and organic impurities from an organic solvent by washing with an aqueous alkali orthophosphate solution sufficient to maintain the pH of the solvent-aqueous mixture at from about 9.5 to about 12.5

U.S. Pat. No. 4,678,650 describes a process for production of an aqueous alkali phosphate solution by mixing an aqueous phase containing an alkali compound with an organic phase containing phosphoric acid in a volume ratio larger than 1:1, and thereafter separating the resulting aqueous alkali phosphate solution from the organic phase.

U.S. Pat. No. 4,751,066 describes a process for the alkaline stripping of wet process phosphoric acid from a water immiscible organic solvent in order to produce a sodium phosphate solution.

In the published international patent application WO 2008/115121, a method and an arrangement for phosphorus recovery are disclosed. Phosphorus ions are extracted from solutions by adsorbing phosphorus ions in a scavenger and by releasing the phosphorus ions into an eluate during regeneration of the scavenger. The regeneration is performed by ammonia. Phosphate anions are precipitated in form of tri-ammonium phosphate upon introduction of excess amounts of ammonia. The ammonia remaining in solution after the precipitation of tri-ammonium phosphate is reused for regenerating the scavenger. Unfortunately, tri-ammonium phosphate is unstable at ambient temperature and atmospheric pressure resulting in the decomposition of the crystal accompanied with release of ammonia which requires further processing into stable forms of ammonium phosphate. Tri-ammonium phosphate is not suitable for direct use in agriculture.

GB 636,035 discloses improvements of processes of producing diammonium phosphate. Crystals of mono-ammonium phosphate are introduced into a solution of diammonium phosphate in a reactor and anhydrous ammonia is fed into the reactor. Diammonium phosphate crystals are collected at the chamber bottom.

In the U.S. Pat. No. 3,415,619, a process for making ammonium phosphate is disclosed. Water-soluble ammonium phosphate is achieved by extracting a substantially iron-free aqueous phosphoric acid, derived from the reaction of calcium phosphate-containing ore and a strong mineral acid, into a water-immiscible extractant, separating the phosphoric acid-laden extractant from the residual aqueous phase, removing the calcium impurities therefrom, contacting the phosphoric acid-laden extractant with anhydrous ammonia at a temperature of between about 20 and 90° C., and separating solid, water-soluble ammonium phosphate from the extractant. The solid ammonium phosphate is indicated to be washed with low boiling hydrocarbon solvents to remove organic extractant adhesive thereto. The process according to this disclosure has several drawbacks. In experiments performed by the applicant of the present invention, it was concluded that it is very difficult to produce di-ammonium phosphate according to the presented ideas even with a large excess of ammonia. The main difficulty of this approach is thus that large amounts of solvent remain adhering to the precipitated ammonium phosphate crystals and this loss of expensive solvent would be economically unacceptable. Removal of adhering solvent by distillation is difficult since the boiling point for solvents such as tributyl phosphate (289° C.) exceeds the melting point for mono-ammonium phosphate (190° C.). Washing the adhering solvent with another hydrocarbon solvent was proved to be incomplete, and considerable amounts of extractant remain even after extensive washing. Furthermore, separation of extractant and hydrocarbon solvent become a complex and expensive task due to the need for distillation.

The published international patent application WO 2010/138045 describes a process comprising addition of ammonia to a phosphorus-loaded water immiscible liquid phase in order to precipitate ammonium phosphates. The precipitated ammonium phosphates are washed with saturated aqueous solution of ammonium phosphate and the washed crystals are dried. Residual scavenger washed form the crystals is separated by a phase separation of the scavenger and the saturated aqueous solution of ammonium phosphate and the separated residual scavenger is reused for further adsorbing of phosphorus to be reused for further extraction. The washing liquid depleted from residual scavenger is reused for further washing of the crystals. A disadvantage is the need for three phase separation.

U.S. Pat. No. 3,518,071 describes a process for production of nitrophosphate fertilizer and ammonium-nitrate calcium-carbonate fertilizers. The process consist of a) digesting phosphate rock with nitric acid to produce a solution of calcium nitrate, phosphoric acid and nitric acid, b) extracting phosphoric acid and nitric acid from the leach solution with amyl alcohol, c) re-extracting phosphoric acid and nitric acid with a concentrated solution of mainly ammonium nitrate containing some ammonium phosphate, with a N/P molar ratio of about 95:1, d) evaporating the strip solution to form a slurry of crystallized ammonium phosphate and ammonium nitrate, e) separating the crystals from the liquor, f) recycling at least a portion of the liquor to be used in step c, g) treating the raffinate from step b with ammonia and carbon dioxide to form ammonium nitrate solution and precipitated calcium carbonate.

The main purpose of U.S. Pat. No. 3,518,071 is to use liquid-liquid extraction for separation of calcium nitrate instead of separating calcium nitrate by precipitation at low temperatures which is the common practice at the nitrophosphate process. There are a number of disadvantages with this method. The final product is generally a mixture of ammonium phosphate and ammonium nitrate and not well-defined mono-ammonium phosphate or di-ammonium phosphate. Furthermore, co-extraction of nitric acid results in precipitation of calcium phosphates which render the liquid-liquid extraction process non-operational. This limits the yield of extracted phosphoric acid. Moreover, a high concentration of ammonium nitrate is required in the solution used for stripping in order to decrease the amount of ammonium phosphate that remains dissolved in the ammonium nitrate liquor. Also, the method requires processing of ammonium nitrate into a final product by water evaporation. Furthermore, the phosphate product contains ammonium nitrate via mother liquor adhering to the precipitate. Moreover, crystallization is obtained by exceeding the solubility of dissolved salts by evaporation of water which requires equipment such as evaporators, steam distribution systems, etc., as well as, an energy source. Finally, amyl alcohol and other solvents suitable for this process have a high water solubility which makes the process complex as the solvent has to be recovered from the aqueous streams by extraction and distillation.

The patent GB 1,238,188 describes a process for production of ammonium phosphates by digesting phosphate rock with nitric acid. The process consist of a) treating the leach solution with a solvent composed of aliphatic alcohols containing 4-6 carbon atoms to extract nitric acid and phosphoric acid, b) purifying the organic extractant by contacting the extractant with a solution composed of mainly ammonium nitrate, c) ammoniating the purified extractant to form a precipitate of ammonium phosphate, a light phase containing the solvent, and a heavy aqueous phase containing ammonium nitrate and ammonium phosphate, d) separating the light phase by decanting and recycling the decanted light phase to the extraction step, e) separating the ammonium phosphate precipitate from the heavy aqueous phase, f) washing the separated ammonium phosphate with water, g) the washing water of ammonium phosphate and part of the heavy aqueous phase containing ammonium nitrate and ammonium phosphate is recycled to the extractant purification step, h) the aqueous solution from the purification step is being recycled into the extraction step, i) the raffinate from the extraction step and part of the heavy aqueous phase containing ammonium nitrate and ammonium phosphate is treated by distillation to recover the solvent from the aqueous phase, and j) treating the distilled aqueous phase with ammonia and carbon dioxide to form ammonium nitrate solution and precipitated calcium carbonate.

Similar to U.S. Pat. No. 3,518,071, there are a number of disadvantages with the method according to the patent GB 1,238,188. Co-extraction of nitric acid results in precipitation of calcium phosphates which limits the yield of extracted phosphoric acid from the leach solution. Furthermore, a high concentration of ammonium nitrate is required during neutralization with ammonia in order to decrease the amount of ammonium phosphate that remains dissolved in the ammonium nitrate liquor. Also, the method requires processing of ammonium nitrate into a final product by water evaporation. Furthermore, the precipitated ammonium phosphate contains ammonium nitrate via mother liquor adhering to the precipitate and washing of the adhering ammonium nitrate with water results in substantial dissolution of the precipitated ammonium phosphate. This requires acidification of the wash water with nitric acid (to convert dissolved ammonium phosphate into ammonium nitrate and phosphoric acid) and re-extraction of phosphoric acid from the wash water which is costly. Finally, solvents suitable for this process have a high water solubility which makes the process complex as the solvent has to be recovered from the aqueous stream by distillation.

U.S. Pat. No. 4,112,118 describes a process for stripping phosphoric acid from an organic solvent with a basic compound of ammonia, sodium or potassium being anhydrous or with water in an amount of up to 10 moles or with a solid dihydrogen phosphate salt, to give a liquid phase mixture comprising an organic solvent phase substantially free of phosphoric acid and an aqueous phase comprising dissolved phosphoric acid and dissolved dihydrogen phosphate of the base. One main disadvantage of the process is that the stripping process requires that the organic solvent is loaded with a highly concentrated phosphoric acid solution of >60% weight. The process thus requires concentration of phosphoric acid by water evaporation, equipment such as evaporators, steam distribution systems, etc., as well as, an energy source. Another main disadvantage of the process is that the product is an aqueous solution which requires further treatment.

Russian patent 424849 describes a method for production of mono-ammonium phosphate by using a solvent composed of tributyl phosphate in a kerosene diluent. The method comprises contacting the tributyl phosphate solvent, which is loaded with phosphoric acid, with a solution of di-ammonium phosphate at an organic to aqueous phase ratio of about 3:1 to form a depleted solvent and mono-ammonium phosphate crystals in a solution of mono-ammonium phosphate. It is further mentioned that the mother liquor can be separated and treated with ammonia to produce a di-ammonium phosphate solution which can be recycled.

It was, however, found by many experiments performed by the applicant of the present invention that stripping a solvent composed of tributyl phosphate in kerosene with a di-ammonium phosphate solution according to the procedure described in Russian patent 424849 results in severe emulsion formation when the stripped solvent is re-contacted with phosphoric acid for further phosphate extraction. The formation of emulsion makes the process non-operational in industrial applications where efficient recirculating of solvent is required.

SUMMARY

A general object of the present invention is to produce fully soluble, pure and well defined mono or di-ammonium phosphate avoiding problems with the prior art. An additional object is to enable production of solid ammonium phosphates without any need for evaporation of water with associated equipment such as evaporators, steam distribution systems, etc., as well as, an energy source for heat production. Another object is to enable production of solid ammonium phosphates by use of liquid-liquid extraction in a robust way enabling efficient recirculation of process liquids. Additional objects are discussed in connection with the different embodiments presented further below.

The above objects are achieved by methods and devices according to the enclosed independent patent claims. Preferred embodiments are defined by the dependent patent claims. In general words, in a first aspect, an arrangement for production of pure ammonium phosphates comprises an extraction section, a stripping section and end treatment arrangements. The extraction section is configured for performing a liquid-liquid extraction of phosphate between a feed liquid comprising phosphoric acid and a solvent. The solvent has a solubility in water of less than 2%, and preferably below 1%. The feed liquid is essentially free from nitrate ions. The extraction section has a first extraction inlet for provision of the feed liquid, a second extraction inlet for provision of the solvent, a first extraction outlet for delivering of the feed liquid at least partly depleted in phosphate and a second extraction outlet for delivering of the solvent loaded with phosphate. The stripping section is configured for performing a liquid-liquid extraction of phosphate between the solvent loaded with phosphate and a strip solution. The stripping section has a first stripping inlet, connected to the second extraction outlet, for provision of the solvent loaded with phosphate, a second stripping inlet for provision of input strip solution, a first stripping outlet for delivering the solvent at least partly depleted in phosphate and a second stripping outlet for delivering output strip solution. The first stripping outlet is connected to the second extraction inlet for recirculating the solvent at least partly depleted in phosphate for further extraction of phosphate. The strip solution is an aqueous ammonium phosphate solution, wherein at least 80% of the ammonium phosphate in the input strip solution is monoammonium phosphate and/or wherein the solvent is a water-immiscible alcohol. The end treatment arrangements comprise a source of ammonia, an adding arrangement, a cooling arrangement, a precipitate remover and a recirculation system. The adding arrangement is connected to the source of ammonia and is configured for adding ammonia from the source of ammonia into at least a partial stream of the strip solution. The cooling arrangement is configured for cooling off heat generated from the chemical reaction when the ammonia from the source of ammonia is added into the at least a partial stream of the strip solution. The precipitate remover is configured for separating crystals from the loaded strip solution. The recirculating system is connected between an outlet from the precipitate remover and the second stripping inlet of the stripping section. The recirculating system is configured for reusing strip solution from the precipitate remover as input strip solution.

In a second aspect, a method for production of pure ammonium phosphates comprises extracting of phosphate from a feed liquid comprising phosphoric acid by a liquid-liquid extraction into a solvent. The solvent has a solubility in water of less than 2% and preferably less than 1%. The feed liquid is essentially free from nitrate ions. The solvent is stripped of at least a part of the phosphate by a liquid-liquid extraction into a strip solution. The strip solution is an aqueous ammonium phosphate solution. The strip solution loaded with stripped phosphate and the solvent at least partially depleted in phosphate are separated. The solvent at least partly depleted in phosphate is recirculated for further extraction of phosphate in the extracting. At least 80% of the ammonium phosphate in the input strip solution is mono-ammonium phosphate and/or the solvent is a water-immiscible alcohol. Ammonia is added into at least a partial stream of the strip solution. Heat generated when said ammonia is added into said at least a partial stream of said strip solution is cooled off. Crystals are removed from the loaded strip solution. The strip solution is recirculated after the step of removing crystals for use as strip solution input in the stripping process.

One advantage with the present invention is that well defined fully soluble, pure and well defined mono or di-ammonium phosphate are possible to produce in an industrially applicable process in an efficient and economic manner. Additional advantages are discussed in connection with the different embodiments presented further below.

BRIEF DESCRIPTION OF THE DRAWINGS

The invention, together with further objects and advantages thereof, may best be understood by making reference to the following description taken together with the accompanying drawing and tables in which.

DETAILED DESCRIPTION

Figure 1:
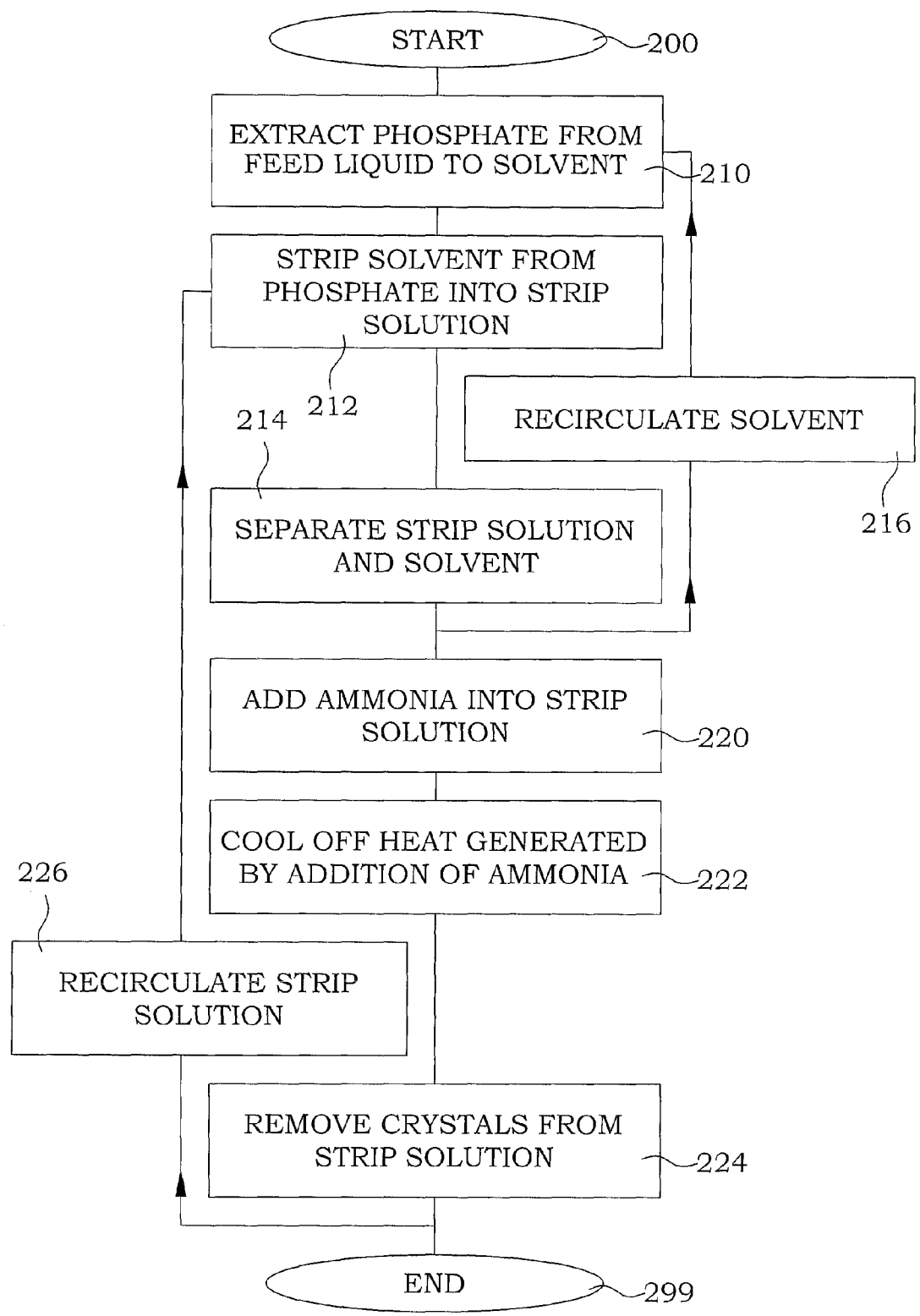
FIG. 1 is a flow diagram of steps of an embodiment of a method for production of ammonium phosphates.

Some often used terminology in the present disclosure is to be interpreted as follows:

Solvent—A liquid phase, typically organic, which preferentially dissolves extractable solute species from an aqueous solution.

Extractant—An active component, typically organic, of a solvent enabling extraction.

Solvent extraction (liquid liquid extraction)—The separation of one or more solutes from a mixture by mass transfer between immiscible phases in which at least one phase typically is an organic liquid.

Stripping—The displacement from the solvent of the ions or acids removed from the process solution to make the solvent ready for reuse.

Diluent—A liquid, typically organic, in which an extractant is dissolved to form a solvent.

Raffinate—An aqueous phase from which a solute has been removed by extraction.

The present disclosure is based on extraction of phosphoric acid with a water-immiscible or at least substantially water-immiscible solvent. Several water-immiscible solvents are suggested in the literature as suitable for extraction of phosphoric acid.

The suggested solvents can generally be divided into the following groups: a) alkyl phosphates such as tributyl phosphate, b) amines such as tri-n-octylamine, c) alcohols such as isoamyl alcohol, n-amyl alcohol, cyclohexanol, methyl cyclohexanol, tertiary amyl alcohol, isobutanol, n-butanol, heptanol, d) ketones such as methyl-isobutyl ketone, methyl propyl ketone, diethyl ketone, methyl ethyl ketone, methyl-n-butyl ketone, e) amides such as butyl acetamide, f) aldehydes such as benzaldehyde, g) esters such as ethyl acetate, butyl acetate, amyl acetate, cyclohexanone, h) ethers such as diethyl ether, di-n-amyl ether, and glycol ethers such as di-ethylene glycol.

All the above mentioned solvents are classified as water-immiscible. However, most of the mentioned solvents have in fact a relatively high solubility in water which may result in contamination of both aqueous streams and the final product with traces of the solvent. High water solubility usually requires recovery of dissolved solvent from aqueous steams by distillation which is costly and complex. For example, n-butanol has a water solubility of ca 90 grams per liter at room temperature. Several of the mentioned solvents have other disadvantages in addition to high solubility such as flammability and subjection to explosion risk, e.g. di-isopropyl ether.

Furthermore, several of the mentioned solvents show very little extraction capacity for phosphoric acid below a specific threshold concentration. This means that the feed phosphoric acid must initially have a high concentration, which usually requires concentration of the acid by water evaporation. In addition, only partial extraction of phosphoric acid is possible with such solvents. A typical example for a solvent with threshold concentration for phosphoric acid extraction is methyl isobutyl ketone. In general, ethers, esters and selected ketones have a threshold concentration for phosphoric acid extraction and are therefore unsuitable for extracting phosphate from low concentration sources.

Tributyl phosphate is commonly used in the phosphate industry for purification of phosphoric acid by liquid-liquid extraction. Tributyl phosphate is non-flammable, has low toxicity and very low solubility in water of ca 0.4 grams per liter at room temperature. Furthermore, the solubility decreases with increasing temperature. Tributyl phosphate has also a reasonably constant distribution coefficient, i.e. ability for extracting phosphoric acid, down to low phosphoric acid concentration. Due to the relatively high density of tributyl phosphate it is commonly mixed with a diluent, such as, aliphatic kerosene in order to improve the physical separation of the immiscible phases.

Tributyl phosphate enables extraction of phosphoric acid in preference to dissolved salts such as chlorides or sulfates, and in preference to dissolved acids such as hydrochloric acid or sulfuric acid. The presence of dissolved salts or acids enhances extraction of phosphoric acid by a salting out mechanism which can enable almost complete extraction of phosphoric acid.

However, tributyl phosphate extracts nitric acid in preference to phosphoric acid which makes selective extraction of phosphoric acid from nitric acid impossible. In general, solvents, which have a low solubility in water, extract nitric acid in preference to phosphoric acid. Solvents with increased selectivity for phosphoric acid such as amyl alcohol have high water solubility and still co-extract considerable amounts of nitric acid. The main advantage of using tributyl phosphate as a solvent for extraction of phosphoric acid is that the low water solubility enables to operate without a need for distilling the solvent from aqueous streams which is costly and complex.

It was mentioned above that most of the suitable solvents have a relatively high solubility in water, e.g. most alcohols. However, alcohols having relatively long carbon chains also have a relatively low water solubility. An alternative solvent for extracting phosphoric acid is therefore long carbon chain alcohols, e.g. heptanol, having a solubility in water of less than 2%, and preferably less than 1%. If the solubility is lower than such a level, the amount of solvent following the water stream becomes reasonably low to be taken care of by not too expensive and complex arrangements.

The Russian patent 424849 mentioned in the background section proposed the use of a solvent composed of tributyl phosphate in a kerosene diluent. However, in many experiments performed by the present inventors, it was concluded that the process according to Russian patent 424849 has major drawbacks which makes it practically non-operational and thus not industrially applicable in an economical aspect. As mentioned further above, it was found that stripping a solvent composed of tributyl phosphate in kerosene with a di-ammonium phosphate solution according to the procedure described in Russian patent 424849 results in severe emulsion formation when the stripped solvent is re-contacted with phosphoric acid solution, e.g. reused in a repeated extraction-stripping process.

The cause for the emulsion formation was further investigated. It was found that after contacting a solvent composed of tributyl phosphate in kerosene with solutions of di-ammonium phosphate of varying concentrations, very small crystals were found in the solvent. The size of the crystals was so small that they are only visible with a microscope. The tested concentrations were according to the Russian patent 424849, as well as higher or lower concentrations, and at a wide range of phase ratios.

It was further found that it took generally more than 24 hours for the micro-crystals to settle and sometimes more than 48 hours. After the crystals have settled, the solvent can again be reused for extraction of phosphoric acid without formation of any emulsion. The existence of the crystals in the stripping section thus caused the emulsion problems in the extraction section, when the solvent was recycled. In other words, a surprising formation of micro-crystals in a later stage manufacturing process induced problems in an earlier stage manufacturing process, mediated by the recycling of the solvent. The separation time in an operational liquid-liquid extraction system is usually less than 20 minutes. The very long separation time required for settling of the micro-crystals makes the process practically non-operational, at least for economically interesting and efficient industrial applications.

It should be emphasized that the emulsion is not observable in the stripping section and it is not until the stripped solvent is reused for further extraction of phosphate that the emulsion occurs.

Furthermore, testing experiments to remove the micro-crystals by washing with water, phosphoric acid or mono-ammonium phosphate solutions were unsuccessful. It was not possible to dissolve the crystals with the mentioned aqueous solutions and an emulsion was formed when the solvent again was contacted with phosphoric acid, also after extensive washing.

It was further found that phosphoric acid probably was an ingredient in the micro-crystals since contacting tributyl phosphate in kerosene which was depleted in phosphoric acid with a di-ammonium phosphate solution did not result in any formation of micro-crystals and emulsion was furthermore not formed upon a subsequent contact with phosphoric acid. It is therefore believed that the micro-crystals probably are composed of ammonium phosphates.

Addition of dodecanol as a modifier to a tributyl phosphate in kerosene solvent did not solve the emulsion problem. Changing the diluent from aliphatic kerosene to an aromatic diluent or using alcohol such as heptanol as a diluent did not solve the emulsion problem either.

It was, however, surprisingly found that a solvent composed of tributyl phosphate in kerosene which is loaded with phosphoric acid can be stripped with a saturated solution of mono-ammonium phosphate without any formation of micro-crystals in the solvent. In the tests solvent loading of 0.4-2 molar $H_3PO_4$ was used and the mono-ammonium phosphate was about 3.5 molar at room temperature. The solvent can thus immediately after stripping be reused for phosphoric acid extraction without formation of emulsion.

In contrast to stripping with a di-ammonium phosphate solution, which is based on conversion of phosphoric acid in the solvent to mono-ammonium phosphate, it was found that when the strip solution is composed of mono-ammonium phosphate stripping becomes based on an extraction equilibrium. In other words, the concentration of residual phosphoric acid in the solvent is dependent on the concentration of stripped phosphoric acid in the ammonium phosphate solution. In table 1, equilibrium concentrations of phosphoric acid in a solvent composed of 80 volume percent tributyl phosphate and 20 volume percent kerosene are shown as a function of phosphoric acid content in saturated mono-ammonium phosphate solution. The concentrations are determined during stripping at room temperature and at an organic to aqueous phase ratio of 1.

Since stripping with a mono-ammonium phosphate solution is being based on extraction equilibrium, complete stripping of phosphoric acid from the solvent will require more than a single contact stage. However, from table 1 it can be seen that stripping with a mono-ammonium phosphate solution is efficient. At an organic to aqueous phase ratio of 1:1 and a phosphoric acid loading of 1.65 molar, stripping of 86% of the phosphoric acid content is possible in a single contact stage. From table 1 it can be further seen that the stripping process can be used for concentrating phosphoric acid in the strip solution by using an organic to aqueous phase ratio larger than 1 during the stripping process. In preferred embodiments, the phosphoric acid concentration during the stripping process can be increased between 2 times up to more than 5 times of the original concentration.

TABLE 1

Equilibrium concentrations of phosphoric acid as a function of phosphoric acid content in saturated mono-ammonium phosphate solution.

| Molar $H_3PO_4$ in water-immiscible solvent | Molar $H_3PO_4$ in saturated $NH_4H_2PO_4$ |
|---|---|
| 0.23 | 1.42 |
| 0.46 | 2.39 |
| 0.78 | 3.49 |
| 1 | 4.33 |

A general advantage of using a mono-ammonium phosphate solution compared with the use of di-ammonium phosphate solution is that mono-ammonium phosphate has a lower viscosity compared to di-ammonium phosphate, which makes the phase separation more rapid and more complete. In general, due to a higher density, stripping with mono-ammonium phosphate was found to be considerably superior to conventional stripping with water with regard to separation time and completeness of the separation.

It was furthermore found that stripping phosphoric acid from a loaded tributyl phosphate solvent with a solution of mono-ammonium phosphate of any concentration can be done in any phase ratio without formation of precipitates as long as the initial temperature of the mono-ammonium phosphate solution is below a level in which the solubility of mono-ammonium phosphate is decreased by the stripping of phosphoric acid. This means that the liquid-liquid extraction in most embodiments is a two-phase extraction. The temperature of the initial mono-ammonium phosphate solution, if saturated, should therefore preferably be below 50° C. and most preferably below 40° C. Furthermore, the temperature of the mono-ammonium phosphate solution should not be decreased during the stripping process below a level set by the difference between the solubility of mono-ammonium phosphate and its concentration in solution in order not to form precipitates. However, if the mono-ammonium phosphate solution is not saturated the temperature can also be higher than 50° C.

One advantage of using mono-ammonium phosphate for stripping is that stripping in most embodiments involves only two phases, one organic and one aqueous, without formation of precipitates. This enables to operate with conventional liquid-liquid extraction equipment such as pulsed-columns, mixer settlers or any other liquid-liquid extraction equipment such as, agitated columns, non-agitated columns, inline mixers, centrifugal contactors, etc.

Further investigations were performed on the use of mixtures of mono- and di-ammonium phosphate for stripping a solvent composed of tributyl phosphate in kerosene. The results are summarized in table 2.

TABLE 2

Emulsion formation during stripping with mixtures of $NH_4H_2PO_4$ and $(NH_4)_2HPO_4$.

| Percent of $(NH_4)_2HPO_4$ (on molar basis) | Percent of $NH_4H_2PO_4$ (on molar basis) | Emulsion formation |
|---|---|---|
| 50 | 50 | Yes |
| 33 | 67 | Yes |
| 25 | 75 | Yes |
| 20 | 80 | No |

Table 2 shows whether emulsion is formed or not during the stripping of a solvent composed of 80 volume percent tributyl phosphate and 20 volume percent kerosene and with a loading of 0.9-1.6 molar $H_3PO_4$, with mixtures of $NH_4H_2PO_4$ and $(NH_4)_2HPO_4$. The phosphate concentration in all solutions used for stripping was set to 3.5 molar. It can be seen that stripping with mixtures of mono- and di-ammonium phosphate results in formation of emulsions, when the stripped solvent subsequently is reused for extraction of phosphoric acid, at a di-ammonium phosphate content higher than 25% on molar basis. Stripping with a solution composed of mono-ammonium phosphate with a di-ammonium phosphate content of 20% on molar basis does not result in formation of micro-crystals in the solvent and an emulsion is not formed during subsequent extraction of phosphoric acid. According to some observations it is believed that at low di-ammonium phosphate content, precipitation takes place in the aqueous phase. In other words, phosphoric acid is initially stripped from the solvent to the aqueous phase and thereafter crystals of mono-ammonium phosphate are formed in the aqueous phase and therefore micro-crystals are not formed in the solvent. At high di-ammonium phosphate content, micro-crystals are formed directly in the solvent even if large mono-ammonium phosphate seed crystals are artificially added during the stripping process.

Amines such as tri-n-octylamine are water-immiscible solvents with very low water solubility (<50 ppm) which are suitable for extraction of phosphoric acid. Testing tri-n-octylamine (20% dodecanol as a modifier, 55% aliphatic kerosene as a diluent) as a solvent for extraction of phosphoric acid and stripping with ammonium phosphate gave results which were similar to the results obtained for tributyl phosphate. Stripping a loaded amine solvent with a di-ammonium phosphate solution resulted in severe emulsion formation which renders the process non-operational. Stripping a loaded amine solvent with a mono-ammonium phosphate solution did not result in any emulsion formation upon reusing the solvent. Stripping a loaded amine solvent with a mixture of 50% $NH_4H_2PO_4$ and 50% $(NH_4)_2HPO_4$ resulted in emulsion formation which renders the process non-operational. Whereas stripping a loaded amine solvent with 80% $NH_4H_2PO_4$ and 20% $(NH_4)_2HPO_4$ did not result in emulsion formation upon reusing the solvent.

Heptanol is a water-immiscible solvent with relatively low water solubility which has a reasonably constant distribution coefficient down to low phosphoric acid concentration. The solubility in water of heptanol is about 1 gram per liter which is more than double the water solubility of tributyl phosphate. In general, alcohols with larger number of carbon atoms have a lower solubility in water, but extraction of phosphoric acid decrease with increased number of carbon atoms. However, the water solubility of heptanol is still sufficiently low to enable operation without requirement for distilling the solvent. A further disadvantage of heptanol in comparison to tributyl phosphate is that extraction of phosphoric acid with heptanol is considerably less efficient. The phosphoric acid loading obtained with heptanol is about half that obtained with tributyl phosphate. However, even though heptanol is inferior to tributyl phosphate it can still be used for phosphate extraction.

It has also surprisingly been found that stripping a heptanol solvent, loaded with phosphoric acid, with a di-ammonium phosphate solution does not result in microcrystals remaining in the solvent. The heptanol solvent can therefore be directly reused for extraction of phosphoric acid without formation of any emulsion. There was no correlation between viscosity or density and the formation of microcrystals remaining in the solvent. Amines have a lower density compared to tributyl phosphate and still emulsion forms upon stripping with a di-ammonium phosphate solution. Heptanol has a higher viscosity compared to tributyl phosphate and emulsion is not formed upon stripping with a di-ammonium phosphate solution and re-contacting with phosphoric acid.

Based on the above presented surprising results, an advantageous arrangement for production of pure ammonium phosphates can be outlined. The arrangement involves an extraction section, a stripping section and end treatment arrangements. The different parts are intimately interdependent regarding composition of the used liquids. The extraction section performs a liquid-liquid extraction of phosphate between a feed liquid comprising phosphoric acid and a solvent. The solvent has a solubility in water of less than 2%. This enables production of ammonium phosphate precipitates with satisfying levels of adhering solvent. The feed liquid has furthermore to be essentially free from nitrate ions, since the suitable solvents in general extract nitric acid in preference to phosphoric acid. The stripping section performs a liquid-liquid extraction of phosphate between the solvent loaded with phosphate and a strip solution. The phosphate depleted solvent is connected back to the extraction section for further extraction of phosphate. The strip solution is an aqueous ammonium phosphate solution. According to the above findings, at least one of two conditions has to be fulfilled. A first condition is that at least 80% of the ammonium phosphate in the input strip solution is monoammonium phosphate. The second condition is that the solvent is a water-immiscible alcohol.

By such arrangements, a strip solution loaded with phosphate is provided in a manner suitable for industrial production. The loaded strip solution is then treated in different manners in order to obtain well defined MAP and/or well-defined DAP. Such end treatment arrangements utilize a source of ammonia. An adding arrangement is connected to the source of ammonia and adds the ammonia into at least a partial stream of the strip solution. Heat is generated by such addition of ammonia and a cooling arrangement is therefore provided for removing that heat. The arrangement also comprises a precipitate remover which separates crystals of MAP or DAP from the loaded strip solution. Finally, a recirculating system is connected between the precipitate remover and the stripping section for enabling reuse of strip solution from the precipitate remover as input strip solution in the stripping section.

The present approach disclosed here above enables production of clean and well defined mono- or di-ammonium phosphate in one and the same plant without a need for concentrating phosphoric acid by water evaporation. This is obtained by a combination of liquid-liquid extraction and chemical precipitation by which emulsions and crude formation due to non-settling precipitates are avoided due to specific properties of the strip solution and/or solvent. In preferred embodiments, operational problems such as formation of precipitates during stripping of the solvent, production of ammonium phosphate precipitates with unsatisfying levels of adhering solvent, are additionally avoided.

FIG. 1 illustrates a flow diagram of steps of a method for production of pure ammonium phosphates. The procedure begins in step 200. In step 210, phosphate is extracted from a feed liquid comprising phosphoric acid by a liquid-liquid extraction into a solvent. The solvent has a solubility in water of less than 2%. The feed liquid is furthermore essentially free from nitrate ions. The solvent is in step 212 stripped of at least a part of the phosphate content by a liquid-liquid extraction into a strip solution. At least 80% of the ammonium phosphate in the input strip solution is monoammonium phosphate and/or the solvent is a water-immiscible alcohol. The strip solution loaded with stripped phosphate and the solvent at least partially depleted in phosphate are separated in step 214. In step 216, the solvent, at least partly depleted in phosphate, is recirculated for further extraction of phosphate in the extracting step 210.

In step 220, ammonia is added into at least a partial stream of the strip solution. In step 222, heat generated when the ammonia is added into the at least a partial stream of the strip solution is cooled off, entirely or partly. Crystals from the loaded strip solution are removed in step 224. In the figure, the steps 220-224 are illustrated as being subsequent steps. However, since they describe different circulating processes, their relative dependencies in time and process liquids may differ from embodiment to embodiment. All steps 220-224 are, however, performed in all embodiments in one way or another. In step 226, the strip solution is recirculated after the step of removing the crystals 224 for use as strip solution input in the step of stripping 212. The procedure ends in step 299.

A number of embodiments of the present ideas will be presented here below in order to describe the advantages and variety possibilities.

Figure 2:
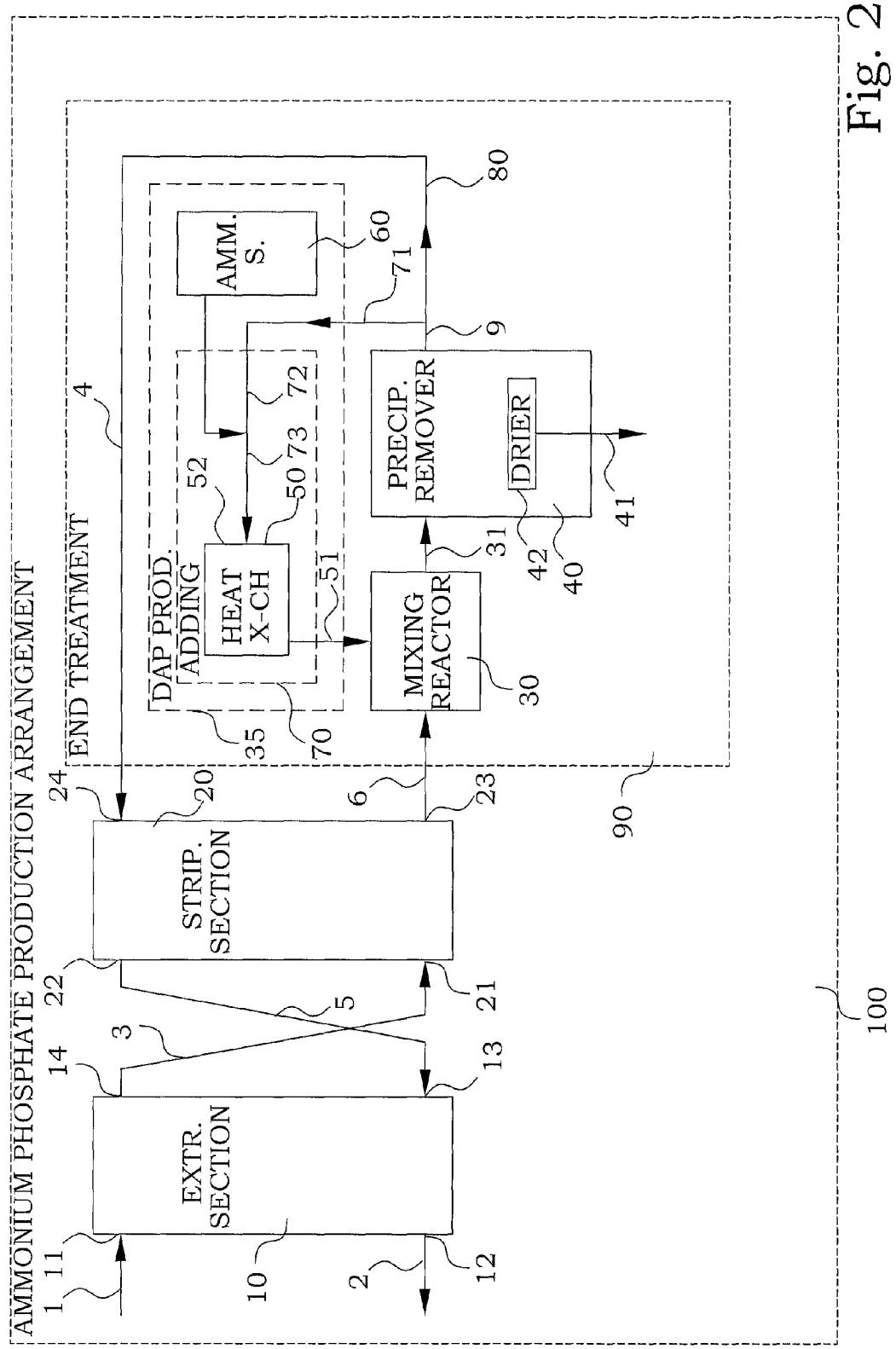
FIG. 2 is a block scheme of an embodiment of an arrangement for production of mono-ammonium phosphate.

An embodiment of an arrangement 100 for production of pure ammonium phosphates, in this embodiment monoammonium phosphate, is illustrated in detail in FIG. 2. A phosphoric acid containing feed liquid 1 is fed to an extraction section 10 configured for performing a liquid-liquid extraction of phosphate between the feed liquid 1 and a solvent 5. The solvent 5 is water-immiscible and has a solubility in water of less than 2%. The water-immiscible solvent 5 is in this particular embodiment tributyl phosphate in aliphatic kerosene.

The phosphoric acid feed liquid 1 is typically obtained by digesting a phosphorus containing material with a mineral acid. The phosphorus containing material can be rock phosphate or other phosphorus containing material such as phosphorus rich ashes such as ash of incinerated sewage sludge, ash of incinerated slaughterhouse waste, ash of manure, etc. The mineral acid used for digestion should preferably be of sulfuric acid, hydrochloric acid or phosphoric acid in order to obtain a selective extraction of phosphoric acid.

The concentration of phosphoric acid in the leach solution can be very low, such as below 7% $P_2O_5$ or even below 4% $P_2O_5$. Dilute phosphoric acid solutions are typical for sludge ash leach solutions. When processing dilute leach solutions it is an advantage that the solution also contains dissolved salts or acids which are not extracted in preference to phosphoric acid but have a salting out effect which enables almost complete extraction of phosphoric acid at low concentrations. Leach solutions with higher phosphoric acid concentration can, of course, be processed according to the invention. There is no limit on the maximum concentration of phosphoric acid.

In alternative embodiments, the phosphoric acid feed liquid 1 can be provided in other ways. The particular way in which the phosphoric acid feed liquid 1 is provided does not substantially influence the main ideas in the present disclosures, as long as the feed liquid is essentially free from nitrate ions, as was discussed further above.

Since the main object of the ideas presented in the present disclosure is to enable production of ammonium phosphates without any need for concentrating phosphoric acid by water evaporation, it is obvious and most beneficial that the concentration of phosphoric acid is the maximum concentration practically possible to obtain by digestion with an acid. Phosphate rock digestion with sulfuric acid according to the di-hydrate process typically results in a phosphoric acid concentration of about 28% $P_2O_5$. The aqueous leach solution is optionally pretreated to remove ionic compounds such as iron, fluorine, etc.

The extraction section 10 has a first extraction inlet 11 for provision of the feed liquid 1, and a second extraction inlet 13 for provision of the solvent 5. The extraction section 10 has also a first extraction outlet 12 for delivering of the raffinate or feed liquid 2 at least partly depleted in phosphate, and a second extraction outlet 14 for delivering of the solvent 3 loaded with phosphate.

As previously discussed, any organic solvent capable of removing phosphorus from aqueous solutions can be used. The mechanism of phosphorus extraction can be solvation of phosphoric acid or both ion association and solvation. The composition of the organic solvent should be selected according to the concentration of the phosphoric acid feed, presence of additional acids or salts, etc. in order to obtain a high loading capacity and an effective operational extraction process. Tributyl phosphate in aliphatic kerosene is used as a preferred solvent in the present embodiment.

The temperature of the water-immiscible solvent 5 is preferably below 60° C. since lower temperatures generally favor phosphoric acid extraction.

The liquid-liquid extraction process in the extraction section 10 is preferably a continuous liquid-liquid extraction process using preferably liquid-liquid extraction equipment such as pulsed-columns. However, any other liquid-liquid extraction equipment can be used such as, agitated columns, non-agitated columns, mixer settlers, inline mixers, centrifugal contactors, etc.

The raffinate 2, i.e. the feed liquid which is at least partially depleted in phosphate, is led to further treatment such as reuse for dissolution, etc.

The water-immiscible solvent 3 which is loaded with phosphoric acid is optionally scrubbed with an aqueous solution to remove co-extracted impurities.

The loading of the solvent 3 depends on the concentration of phosphoric acid in the feed liquid 1, concentration of dissolved salts and acids, phase ratio of input water-immiscible solvent 5 to feed liquid 1, as well as, number of contact stages during extraction in the extraction section 10. A special advantage with the present embodiment is that high yield of ammonium phosphate production can be obtained even with very low loading of phosphoric acid in the solvent 3. The phosphoric acid loading in the solvent 3 can be below 2% $P_2O_5$ and still high yield of solid ammonium phosphate can be obtained by increasing the concentration of phosphoric acid during the stripping process. Of course, the loading of the solvent 3 can be higher. A typical feed solution obtained from digestion of rock phosphate with sulfuric acid according to the di-hydrate process usually results in a phosphoric acid loading of ca 6% $P_2O_5$ in the water-immiscible solvent 3.

Returning to FIG. 2, the phosphorus-loaded water-immiscible solvent 3 is thereafter provided to a stripping section 20. The stripping section 20 is configured for performing a liquid-liquid extraction of phosphate between the solvent 3 loaded with phosphate and a strip solution 4. The strip solution 4 is an aqueous ammonium phosphate solution. In the present embodiment, substantially all the ammonium phosphate in the input strip solution 4 is monoammonium phosphate.

The stripping section 20 has a first stripping inlet 21, connected to the second extraction outlet 14, for provision of the solvent 3 loaded with phosphate. The stripping section 20 also has a second stripping inlet 24 for provision of input strip solution 4. The stripping section 20 furthermore has a first stripping outlet 22 for delivering the solvent 5 at least partly depleted in phosphate, and a second stripping outlet 23 for delivering output strip solution 6. The first stripping outlet 22 is connected to the second extraction inlet 13 for recirculating the solvent 5 at least partly depleted in phosphate for further extraction of phosphate in the extraction section 10.

The stripping section 20 is preferably a continuous liquid-liquid extraction process using preferably liquid-liquid extraction equipment such as pulsed-columns or mixer settlers. However, any other liquid-liquid extraction equipment can be used such as, agitated columns, non-agitated columns, inline mixers, centrifugal contactors, etc.

When producing mono-ammonium phosphate according to the present embodiment, the ammonium phosphate solution 4 is preferably a recycled mono-ammonium phosphate solution, e.g. having a concentration of about 30 percent by weight and a pH of about 3.5.

In cases in which the phosphoric acid loading in the solvent is low, the phosphoric acid concentration is increased during the stripping process by using an organic to aqueous phase ratio larger than 1. This requires several contact stages for obtaining complete stripping of phosphoric acid. The phosphoric acid concentration during the stripping process can usually be increased between 2 times up to more than 5 times of the original concentration. The output strip solution 6 is in the present embodiment composed of a mixture of $NH_4H_2PO_4$ and $H_3PO_4$ in the case of using a solution of $NH_4H_2PO_4$ for stripping. The output strip solution 6 is provided to a number of end treatment arrangements 90.

The end treatment arrangements 90 of the present embodiment comprise a source of ammonia 60. Furthermore, an adding arrangement 70 is connected to the source of ammonia 60. The adding arrangement 70 is configured for adding ammonia from the source of ammonia 60 into at least a partial stream 71 of the strip solution. In this embodiment, a part of a strip solution 9 exiting a precipitate remover 40, which will be further described below, is deviated and the ammonia from the source of ammonia 60 is added to that partial stream 71. In the present embodiment, the partial stream 71 comprises a solution of mono-ammonium phosphate 72, and by adding the ammonia, the solution is transferred into a solution of di-ammonium phosphate 73.

Addition of ammonia to the partial stream 71 of aqueous ammonium phosphate solution results in heat generation. This process is thus an exothermic process and in the present embodiment used for production of mono-ammonium phosphate, the resulting ammoniated solution 73 is composed of a mixture of $NH_4H_2PO_4$ and $(NH_4)_2HPO_4$, which furthermore becomes heated. A cooling arrangement 50 is therefore provided, configured for cooling off heat generated when the ammonia from the source of ammonia 60 is added into the partial stream 71 of the strip solution. This heat of neutralization is preferably removed by a heat exchanger 52. A cooled solution of a mixture of mono-ammonium phosphate and di-ammonium phosphate 51 leaves the cooling arrangement 50.

As will be discussed further below, the solution of a mixture of mono-ammonium phosphate and di-ammonium phosphate 73 is preferably cooled more than what is given by the addition of ammonia. Addition of ammonia to a saturated $NH_4H_2PO_4$ solution 72 results in considerable increase in the solubility limit of the ionic species in solution as long as the ammonia addition is up to a certain level. This enables to cool the ammonium phosphate solution 51 to temperature below the temperature of the strip solution 6 without formation of any precipitates. Heat exchange can thus be performed without scale formation on heat exchangers.

According to the literature it is known that neutralization of phosphoric acid to di-ammonium phosphate results in a higher heat release (1510 kcal/kg gaseous $NH_3$ reacted, or 990 kcal/kg liquid $NH_3$ reacted) compared with neutralization of mono-ammonium phosphate to di-ammonium phosphate (1130 kcal/kg gaseous $NH_3$ reacted, or 610 kcal/kg liquid $NH_3$ reacted). This means that by adding ammonia to a saturated mono-ammonium phosphate solution, total heat generation is lower compared to production of mono-ammonium phosphate by direct neutralization of phosphoric acid with ammonia.

In addition, according to a preferred embodiment according to FIG. 2, heat exchange can be performed by using ammonia refrigeration. In that manner the cooling effect of converting liquid ammonia into gaseous ammonia can be used for removing heat of neutralization. Obtained gaseous ammonia can then be used as the ammonia feed. Of course, heat exchange can be performed by exchanging heat with other liquids such as water or gases such as air.

Addition of ammonia should preferably be proportional to the phosphate loading in the water immiscible solvent 3. Conductivity decreases and pH level increases with decreasing concentration of phosphoric acid in the solvent. Addition of ammonia can thereby be controlled by monitoring pH and/or conductivity in the solvent 3 with a suitable sensor. Another alternative is to monitor pH and/or conductivity in the strip solution 6 or in the reuse circuit before or after addition of ammonia with suitable sensors.

In alternative embodiments, it is possible to add ammonia from the source of ammonia directly to the strip solution 6 in order to form mono-ammonium phosphate from the remaining phosphoric acid. However, neutralization of phosphoric acid with ammonia is highly exothermic and results in significant heat formation which then must be removed in the process. The heat generation is about 20° C. per neutralization of 1 molar phosphoric acid to mono-ammonium phosphate with liquid ammonia and about 25° C. per neutralization of 1 molar phosphoric acid to mono-ammonium phosphate with gaseous ammonia. Direct neutralization of a strip solution 6, containing about 3.5 molar phosphoric acid, results in a temperature increase of about 88° C. when using gaseous ammonia. The solubility of ammonium phosphates is very temperature dependent. For example, the solubility of mono-ammonium phosphate at 20° C. is about 40 g per 100 ml water and at 100° C. the solubility increase to about 170 g per 100 ml water. This implies that if ammonia is added directly to the strip solution 6 containing phosphoric acid, there is no precipitation of ammonium phosphates due to a higher solubility at a higher temperature. It is indeed possible to cool the strip solution 6 after addition of ammonia by heat exchange. However, since the solubility of ammonium phosphates is temperature dependent this procedure may result in crystallization of ammonium phosphates upon heat exchangers which reduces heat exchange efficiency and requires frequent scale removal which is unwanted and makes it difficult to operate continuously.

Therefore, preferably, according to the embodiment of FIG. 2, spontaneous precipitation of mono-ammonium phosphate is instead caused upon mixing the strip solution 6 with the recycled and cooled di-ammonium phosphate solution 51 in a mixing reactor 30. It was found that if the strip solution 6 and the recycled di-ammonium phosphate solution 51 have the same temperature, the temperature increase during precipitation of mono-ammonium phosphate is only about 2° C. per molar precipitated phosphate. For a phosphoric acid concentration of 3.5 molar in the strip solution 6, the temperature increase is only about 7° C. in the mixing reactor 30. Compared with a temperature increase of about 88° C. for neutralizing the strip solution directly with gaseous ammonia, such a temperature increase is easily handled. As mentioned above, the recycled and cooled di-ammonium phosphate solution 51 can be controlled to have a temperature which is lower than the temperature of the strip solution 6, which can compensate for the temperature increase during precipitation of mono-ammonium phosphate, obtained by combining the strip solution 6 with the recycled di-ammonium phosphate solution 51.

In other words, the cooling arrangement is configured for maintaining a temperature of the loaded strip solution below a saturation temperature for monoammonium phosphate, whereby crystals of monoammonium phosphate are precipitated. The cooling is preferably performed in a stream of ammonium phosphate in which precipitation does not occur. In a preferred embodiment, the adding arrangement 70 comprises the cooling arrangement 50. The actual cooling can also be performed in different ways. The cooling arrangement 50 can e.g. operate on the liquid stream into which the ammonia is going to be added, i.e. before the mixing. The cooling arrangement 50, can alternatively or in combination also operate on the liquid stream into which the ammonia has been added. Finally, also the ammonia that is going to be added may be cooled. The cooling arrangement 50 is typically a heat exchange device 52. However, any other alternative cooling arrangements 50 can also be utilized, such as Peltier elements, cooling by heat conduction etc.

In this way, according to the present embodiment, precipitation of mono-ammonium phosphate occurs in the mixing reactor 30 without any requirement of cooling the mixing reactor 30 itself. In such a way, crystallization of ammonium phosphate upon heat exchangers is avoided, which improves the heat exchange efficiency of the process and makes continuous operation easy and robust without requirement for frequent scale removal from heat exchangers.

The slurry 31 exiting the mixing reactor 30 is composed of $NH_4H_2PO_4$ crystals in a saturated $NH_4H_2PO_4$ solution. The slurry 31 exiting the mixing reactor 30 is fed to the earlier mentioned precipitate remover 40. The precipitate remover 40 is configured for separating crystals 41 from the loaded strip solution 31 exiting the mixing reactor 30. Separation can be done by any solid-liquid separation technique such as filtration, settling, centrifugation, etc.

In other words, end treatment arrangements 90 comprise a diammonium phosphate supplying arrangement 35 and a mixing reactor 30. The mixing reactor 30 is connected to the second stripping outlet 23 of the stripping section 20 and the diammonium phosphate supplying arrangement 35. The mixing reactor 30 is configured for mixing a diammonium phosphate solution into the output strip solution 6 from the stripping section 20. In this embodiment, the cooling arrangement 50 is configured for maintaining a temperature of the solution 31 leaving the mixing reactor 30 below a saturation temperature for monoammonium phosphate. This thereby causes crystals of monoammonium phosphate to precipitate from a saturated monoammonium phosphate solution. The precipitate remover 40 is therefore in this embodiment configured for separating crystals of monoammonium phosphate. The diammonium phosphate supplying arrangement 35 comprises in this embodiment the adding arrangement 70. The adding arrangement 70 comprises in this embodiment an inlet connected to the outlet from said precipitate remover 40 for supply of the partial stream 71 of the strip solution 9 exiting the precipitate remover 40. The adding arrangement is configured for adding the ammonia from the source of ammonia 60 into the partial stream 71 of the strip solution exiting the precipitate remover 40, thereby forming a solution comprising diammonium phosphate. The adding arrangement is further configured for returning the solution comprising diammonium phosphate to the diammonium phosphate mixing reactor 30. The cooling arrangement is configured for maintaining a temperature of the loaded strip solution below a saturation temperature for monoammonium phosphate, whereby crystals of monoammonium phosphate are precipitated.

The separated crystals can be dried in a drier 42 and/or granulated according to known processes forming a final mono-ammonium phosphate product. Since the adhering solution is a saturated mono-ammonium phosphate solution, the water content in the separated crystals is low. The separated crystals can also be mixed with other ingredients such as nitrogen and potassium forming different fertilizer products.

It was found that residual solvent in the precipitated crystals, according to the present embodiment, is very low since it only corresponds to dissolved solvent in the solution adhering to the separated crystals. The water solubility of water-immiscible solvents such as tributyl phosphate is low which results in solvent levels below 20 ppm in the precipitated crystals after separation.

Furthermore, according to a further embodiment, it is possible to remove traces of dissolved solvent from the aqueous solution before the precipitation of ammonium phosphates. This can be done by adding an oxidizer such as hydrogen peroxide, etc. in order to oxidize traces of solvent to carbon dioxide and phosphoric acid. In such a manner it is possible even to eliminate the presence of residual solvent in the product. In addition, also if other contaminants such as fluorine etc. are co-extracted with phosphoric acid they can be removed from the strip solution by precipitation, extraction, etc. before precipitation of ammonium phosphates.

Returning to the embodiment of FIG. 2, the aqueous ammonium phosphate solution 9 exiting the precipitate remover 40 is split into two parts. One partial stream of the aqueous mono-ammonium phosphate solution 4 is recycled back to the second stripping inlet 24 of stripping section 20. The arrangement thereby comprises a recirculating system 80 connected between an outlet from the precipitate remover 40 and said second stripping inlet 24 of said stripping section 20, where the recirculating system 80 is configured for reusing strip solution 4 from the precipitate remover 40 as input strip solution. A second partial stream 71 of the aqueous ammonium phosphate solution is as mentioned above ammoniated by adding gaseous or liquid ammonia.

The amount of ammonia that is introduced into the system is entirely used for creation of the ammonium phosphate crystals. The losses of ammonia during these processes are very small. In order to achieve an equilibrium in the process, the adding arrangement 70 is preferably configured to add an amount of substance of ammonia to the adding arrangement 70 that is in dependence of an amount of substance of stripped phosphate in the strip solution 6 exiting said second stripping outlet 23 of the stripping section 20. The added amount of substance of ammonia is also dependent on the relative amounts of monoammonium phosphate and/or diammonium phosphate that are produced, see embodiments described further below.

The following is an example of production of ammonium phosphate according to the embodiment of FIG. 2. Flows correspond to mono-ammonium phosphate production from sewage sludge ash in a capacity of 20,000 tons ash per year.

A flow of 12.3 cubic meters per hour of a water-immiscible solvent 5 composed of 80 volume percent tributyl phosphate and 20 volume percent kerosene and a flow of 5.3 cubic meter per hour of a treated ash leach solution 1 containing 155 kg $H_3PO_4$ per cubic meter are fed into a liquid-liquid extraction section having six contact stages. The outflows from the extraction section are 12.3 cubic meter per hour of a water-immiscible solvent 3 containing 65 kg $H_3PO_4$ per cubic meter and 5.3 cubic meter per hour of a phosphate depleted raffinate 2. The flow of 12.3 cubic meter per hour of the loaded water-immiscible solvent 3 and a flow of 4.1 cubic meter per hour of recycled solution 4 containing 402 kg dissolved $NH_4H_2PO_4$ per cubic meter are fed into a second liquid-liquid extractor, the stripping section 20, having five contact stages. The outflows from the stripping section 20 are 12.3 cubic meter per hour of a phosphate depleted water-immiscible solvent 5 and 4.1 cubic meter per hour of an aqueous solution 6 containing 191 kg $H_3PO_4$ and 402 kg $NH_4H_2PO_4$ per cubic meter all in dissolved form.

The flow of 4.1 cubic meter per hour of strip solution 6 and a flow of 2.3 cubic meter per hour of an ammonium phosphate solution 51 containing 462 kg $(NH_4)_2HPO_4$ per cubic meter are fed into the mixing reactor 30. The outflow from the mixing reactor 30 is 6.4 cubic meters per hour of slurry composed of 14.4% solid $NH_4H_2PO_4$ in a solution containing 402 kg dissolved $NH_4H_2PO_4$ per cubic meter. The slurry is fed to a solid-liquid separator as a precipitate remover 40, which separates 920 kg of solid $NH_4H_2PO_4$ crystals 41 per hour for further processing. Water is added to the separated liquids in order to compensate for water adhering to separated crystals.

A flow of 6.4 cubic meters per hour of separated liquids 9 containing 402 kg dissolved $NH_4H_2PO_4$ per cubic meter is divided into two flows. One flow 4 of 4.1 cubic meter per hour containing 402 kg dissolved $NH_4H_2PO_4$ per cubic meter is recycled and used for stripping a water-immiscible solvent loaded with phosphoric acid 3. A second flow of 2.3 cubic meters per hour containing 402 kg dissolved $NH_4H_2PO_4$ per cubic meter is ammoniated by mixing 114 kg per hour of anhydrous ammonia. After removal of heat of neutralization by heat exchange, the flow of 2.3 cubic meters per hour 51 now containing 462 kg dissolved $(NH_4)_2HPO_4$ per cubic meter is fed into the mixing reactor 30 as described above.

According to the example above, even though the loading of the solvent 3 is only 65 kg phosphoric acid per cubic meter, a yield of 402 kg of solid ammonium phosphate per cubic meter of strip solution 6 is obtained at room temperature without cooling the mixing reactor with a heat exchanger.

The objects with the present embodiment were many. One object was to avoid operational problems such as emulsions and crude formation. In particular, the object was to form a regenerated solvent without contamination with micro-crystals. An additional object is to provide pure ammonium phosphates with very low contamination of adhering water-immiscible solvent. Another object of the present invention is to provide a high yield of ammonium phosphates by spontaneous precipitation without requirement for cooling during precipitation. Yet another object of the present invention is to enable improved phase separation during stripping of phosphoric acid from the solvent. Another object of the present invention is to enable recycling of the solvent without need for further treatment by liquid-liquid extraction or distillation. Yet another object of the present invention is to provide a cost effective method for production of ammonium phosphates without the need for scrubbing ammonia from effluent vapors. All these objects were achieved by the embodiment of FIG. 2.

In a comparison with the method according to the Russian patent 424849, the present embodiment has additional advantages. Precipitation of mono-ammonium phosphate according to the Russian patent 424849 is based on formation of a mixture of three phases: solvent, crystals and aqueous solution. Formation of precipitates during the stripping process requires the use of special equipment that can handle three phases. Conventional liquid-liquid extraction equipment can therefore not be used. Furthermore, operation with three phases can promote crude formation which can lead to operational problems. In addition, in performed experiments, it was found that separation of residual solvent from mono-ammonium phosphate crystals by feeding a mixture of the above mentioned three phases to a commercial centrifuge results in too high levels of residual solvent in crystals (>3000 ppm tributyl phosphate). Separation of the three phases by gravity results in somewhat lower residual solvent in crystals but the purity of the crystals was found to be dependent on the organic to aqueous volume ratio in the three phase mixture. With the organic to aqueous volume ratio required according to Russian patent 424849 for obtaining stoichiometric stripping/precipitation of mono-ammonium phosphate, the level of residual solvent in crystals is still too high even when gravity separation is used (>1000 ppm tributyl phosphate).

If di-ammonium phosphate is the desired end product, precipitated mono-ammonium phosphate can be converted to di-ammonium phosphate by feeding the precipitated mono-ammonium phosphate and ammonia into a reactor containing a di-ammonium phosphate solution according to the process described in GB 636,035.

Figure 3:
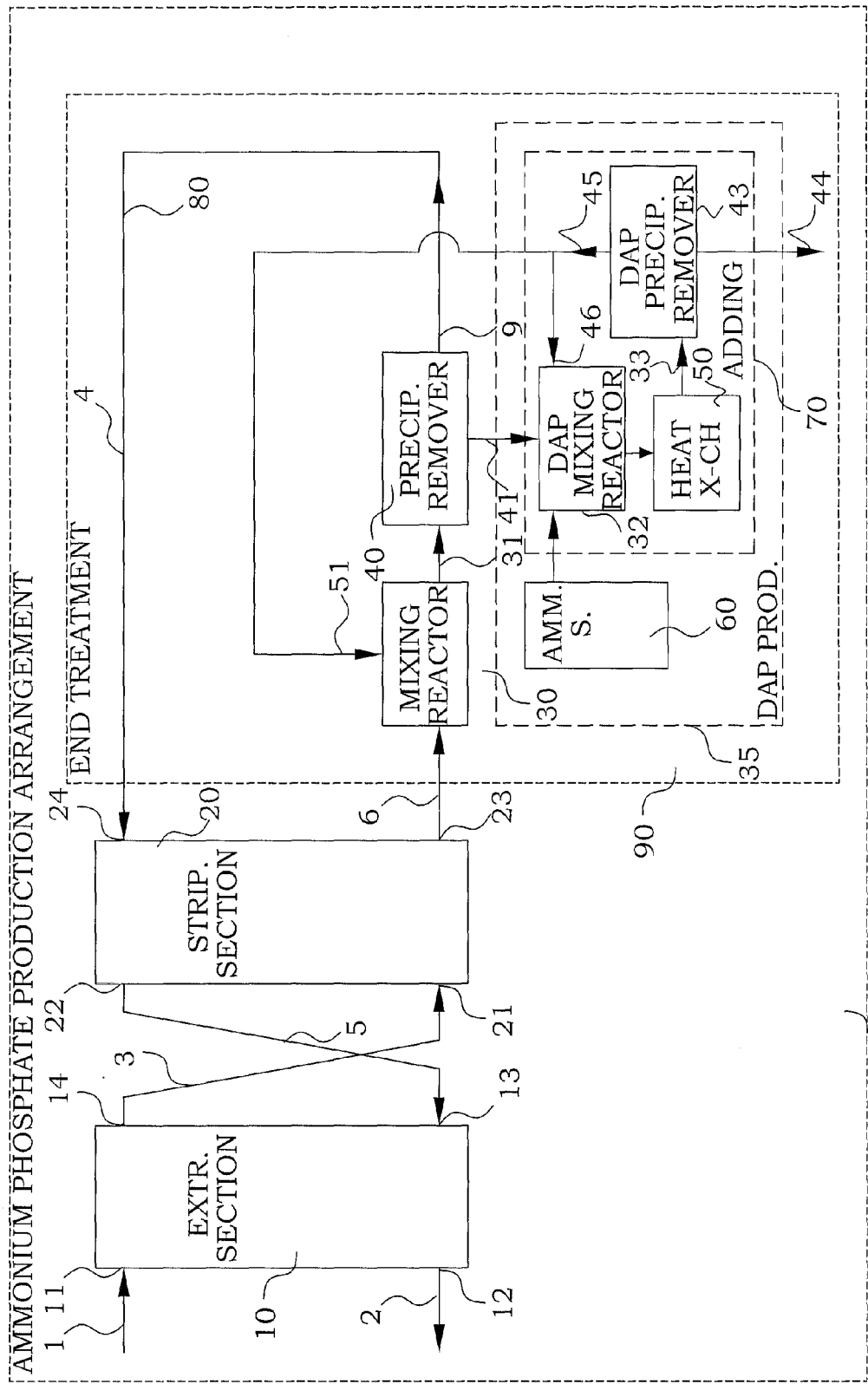
FIG. 3 is a block scheme of an embodiment of an arrangement for production of di-ammonium phosphate.

Furthermore, an embodiment of an arrangement for direct production of di-ammonium phosphate is illustrated in FIG. 3. The extraction section 10 and the stripping section 20 are the same as presented in FIG. 2, however, the end treatment arrangements 90 are somewhat modified. The diammonium phosphate supplying arrangement 35 provides as previous a solution comprising di-ammonium phosphate to the mixing reactor 30 for precipitation of mono-ammonium phosphate. However, the details of the diammonium phosphate supplying arrangement 35 are now somewhat different, which will be discussed further below. Precipitated mono-ammonium phosphate 41, possibly together with some remaining solution of mono-ammonium phosphate, is provided as a slurry to a DAP conversion reactor 32. Ammonia from the source of ammonia 60 is fed into the DAP conversion reactor 32. In other words, a diammonium phosphate production portion is configured for adding ammonia to a stream originating from the loaded strip solution, e.g. via the precipitate remover 40 as in this embodiment, or direct from the stripping section 20, as discussed in later embodiment. The addition of ammonia results in precipitation of diammonium phosphate and provides a slurry 33 of di-ammonium phosphate crystals in a di-ammonium phosphate solution. The slurry 33 is cooled by the cooling arrangement 50 by heat exchange to a temperature preferably below 90° C. Di-ammonium phosphate crystals 44 are separated from the mother liquid 45 in a DAP precipitate remover 43. A first part 46 of the separated di-ammonium phosphate solution is recycled to the DAP conversion reactor 32. A second part 51 of the separated di-ammonium phosphate solution 45 is recycled to the mixing reactor 30 to form precipitated intermediate mono-ammonium phosphate. In such a manner, ammonia addition and heat exchange during conversion of mono-ammonium phosphate into di-ammonium phosphate is utilized for the production of the intermediate mono-ammonium phosphate.

The embodiments of FIG. 2 and FIG. 3 can also be combined in such a way that only a part of the MAP crystals separated in the precipitate remover 40 is brought into the DAP conversion reactor 32. The remaining part remains as MAP. In such a way, it is possible to produce well-defined mono-ammonium phosphate and well-defined di-ammonium phosphate in the same plant.

Figure 4:
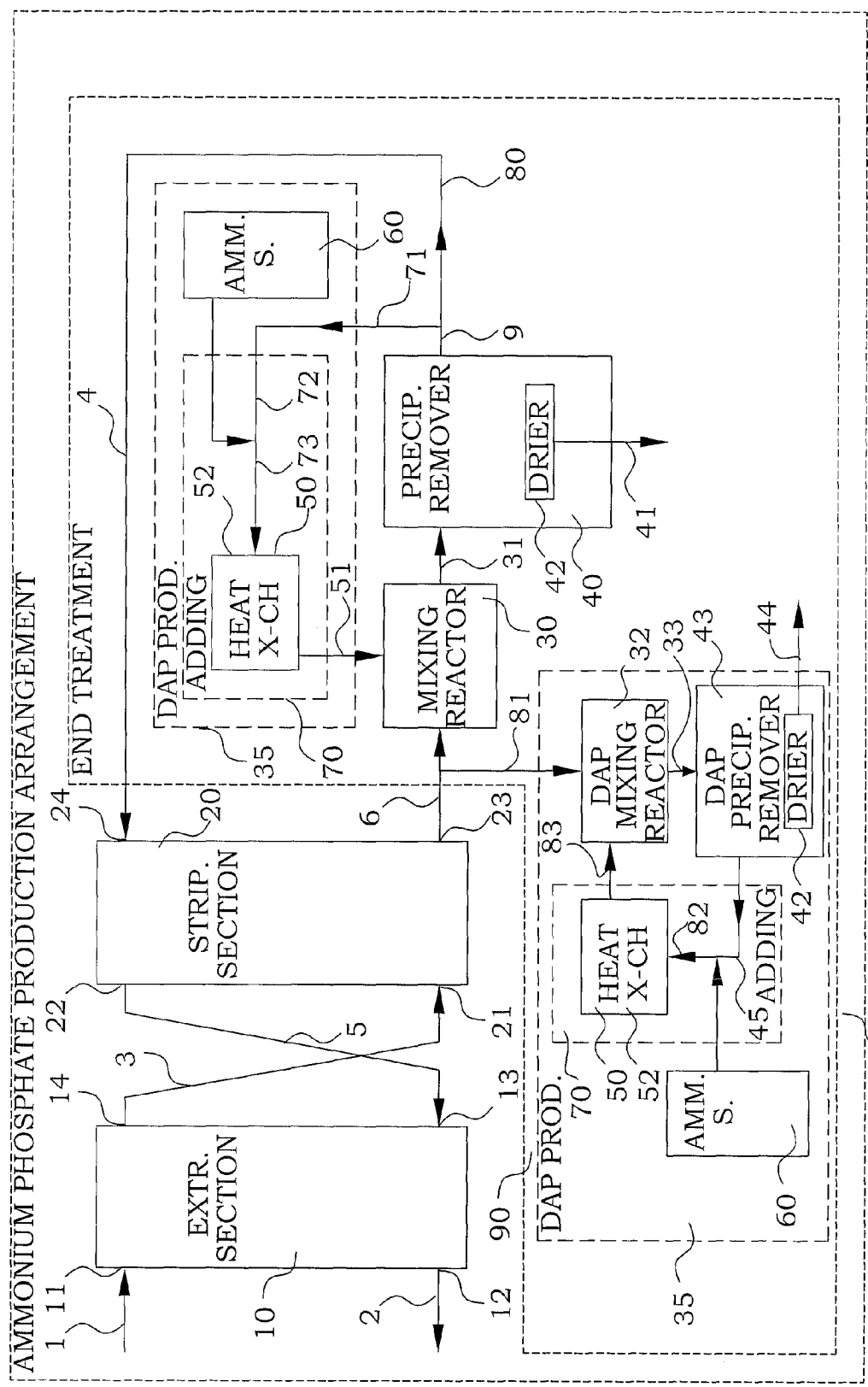
FIG. 4 is a block scheme of an embodiment of an arrangement for production of both mono-ammonium phosphate and di-ammonium phosphate.

Another embodiment for simultaneous production of well-defined mono-ammonium phosphate and well-defined di-ammonium phosphate is illustrated in FIG. 4. Here a partial stream 81 of the strip solution 6 loaded with mono-ammonium phosphate and phosphoric acid is entered into a DAP mixing reactor 32. A solution or slurry of tri-ammonium phosphate 83 is added. With appropriate mixing ratios and with an appropriate temperature, a di-ammonium phosphate slurry 33 will be formed. The cooling arrangement is preferably configured for maintaining a temperature of the loaded strip solution below a saturation temperature for diammonium phosphate, whereby crystals of diammonium phosphate are precipitated. The slurry 33 comprises precipitated di-ammonium phosphate crystals as well as a saturated di-ammonium phosphate solution. The di-ammonium phosphate crystals 44 are removed in the DAP precipitation remover 43, leaving a saturated di-ammonium phosphate solution 45. The saturated di-ammonium phosphate solution 45 is led to a second adding arrangement 70, in which ammonium from a second ammonium source 60 (or from the ammonium source used for the mono-ammonium phosphate production) is added. A slurry of tri-ammonium phosphate 82 is formed, which is cooled down in a heat exchanger 52, to provide the slurry of tri-ammonium phosphate 83 to be used in the DAP mixing reactor 32.

Figure 5:
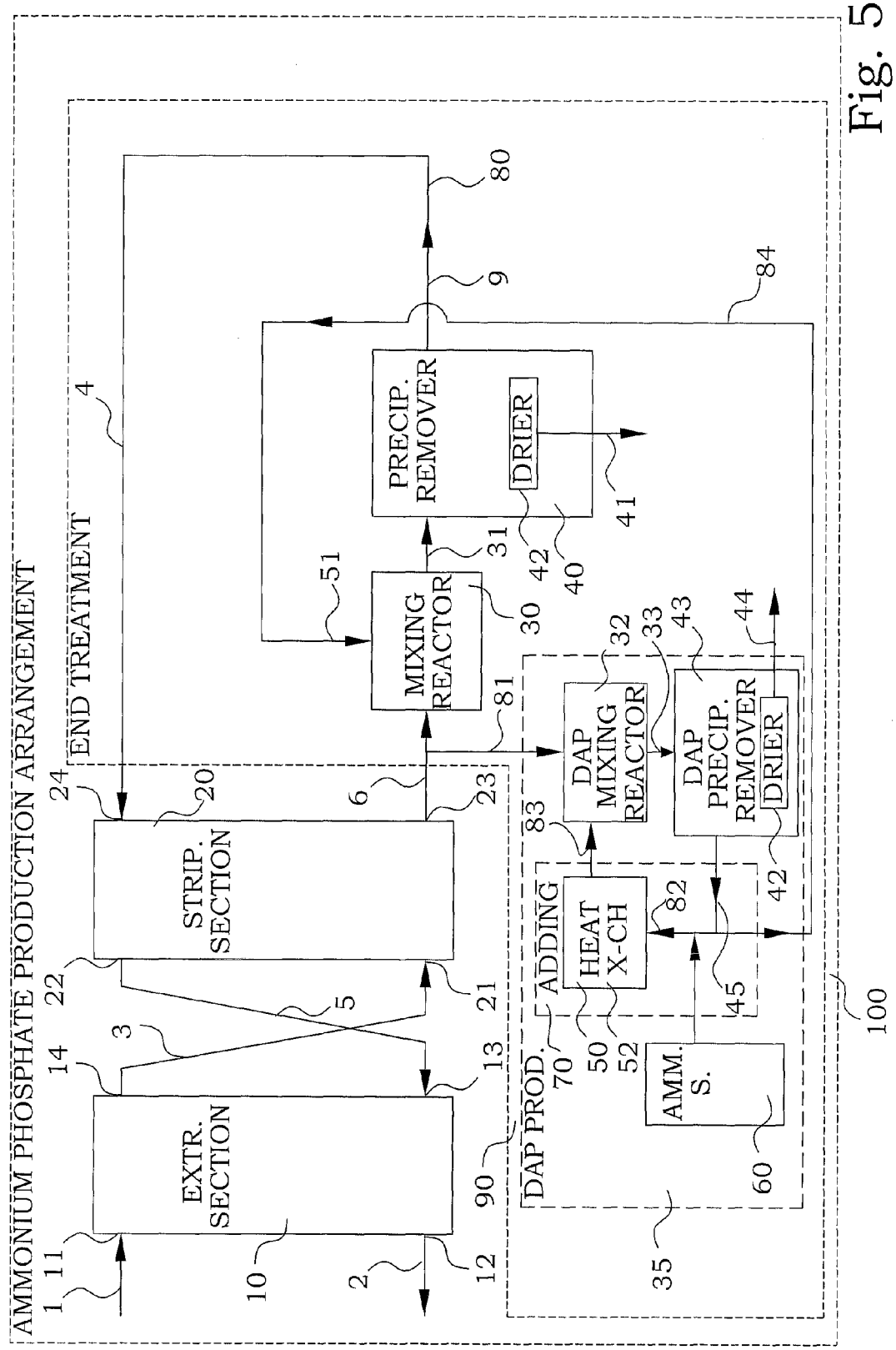
FIG. 5 is a block scheme of another embodiment of an arrangement for production of both mono-ammonium phosphate and di-ammonium phosphate.

A drawback with this embodiment is that the di-ammonium phosphate production part successively will collect volumes of di-ammonium phosphate solutions that are not re-circulated back to the stripping section. At the same time, the mono-ammonium phosphate production part will loose the corresponding volumes, which have to be replaced. Another embodiment, at least partly solving that problem is illustrated in FIG. 5. Here, the diammonium phosphate supplying arrangement 35 connected to the stream of mono-ammonium phosphate is omitted. Instead, the diammonium phosphate supplying arrangement 35 of the di-ammonium phosphate production is used for the supply of diammonium phosphate 51 to the mixing reactor 30. To this end, a partial stream 84 of the ammonium phosphate solution 45, in this embodiment a solution of diammonium phosphate, leaving a precipitation remover, in this embodiment the DAP precipitation remover 43, is re-circulated to be used in the production of mono-ammonium phosphate.

In other words, the diammonium phosphate production portion is configured for adding ammonia to a stream comprising monoammonium phosphate. This causes crystals of diammonium phosphate to precipitate from a saturated diammonium phosphate solution. The diammonium phosphate supplying arrangement comprises a diammonium phosphate reconnection, connecting a part stream of the saturated diammonium phosphate solution from the diammonium phosphate production portion as the supplied diammonium phosphate to the production of monoammonium phosphate.

In a further embodiment, the embodiments of FIGS. 4 and 5 can be combined, such that the mixing reactor can have a supply of diammonium phosphate solution from either of the diammonium phosphate supplying arrangements 35. The amount of diammonium phosphate solution from the different parts can then be controlled to suit a requested ratio of produced monoammonium phosphate crystals and diammonium phosphate crystals.

Figure 6:
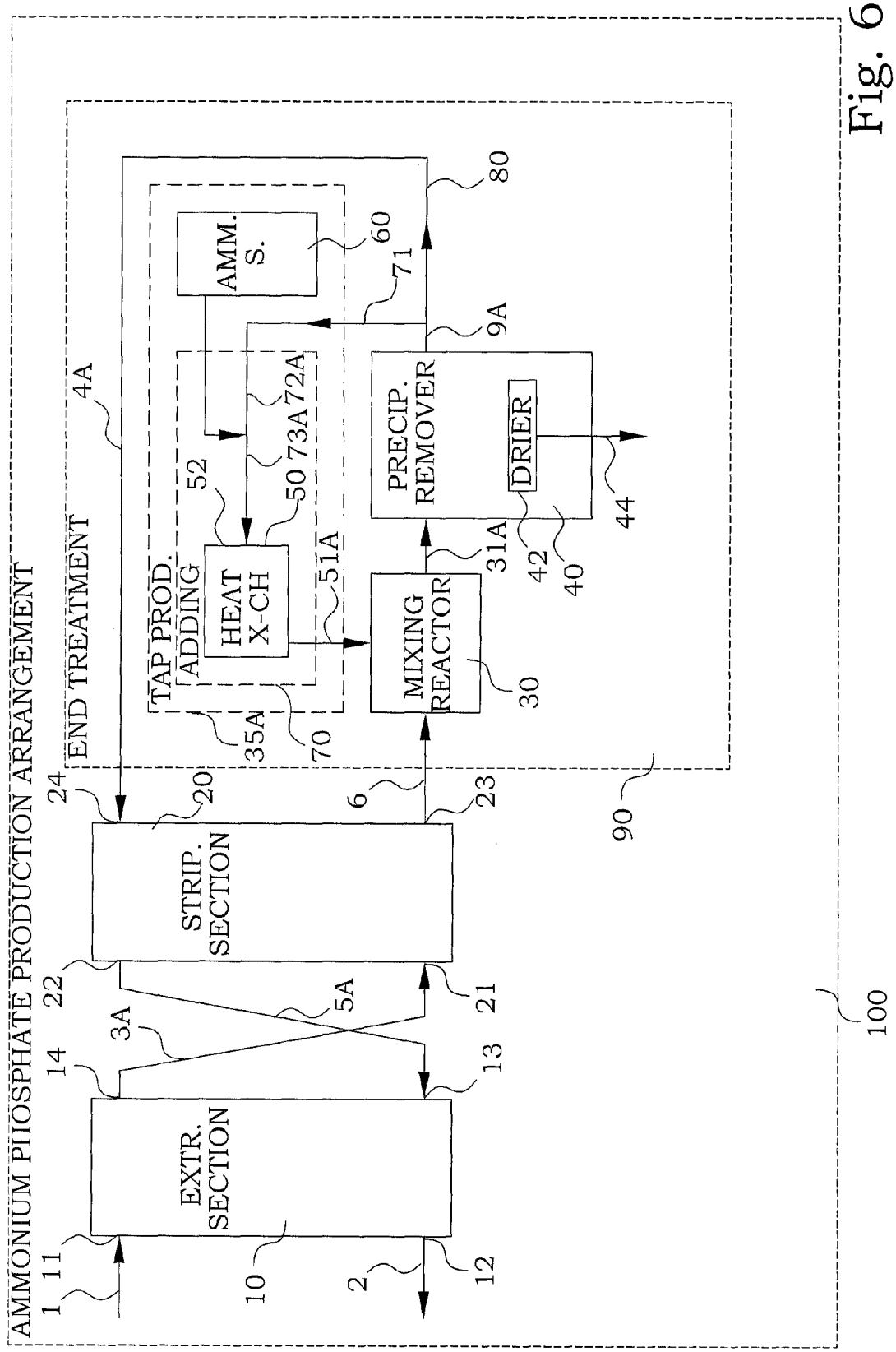
FIG. 6 is a block scheme of another embodiment of an arrangement for production of di-ammonium phosphate.

An additional embodiment of an arrangement for production of di-ammonium phosphate according to the present invention is hereby described with reference to FIG. 6. Most parts are similar as in FIG. 2 and the differences consist mainly of the type of solutions used in the different parts of the arrangement. The phosphoric acid containing feed solution 1 is fed to a liquid-liquid extraction section 10. The water-immiscible solvent 5A is in this embodiment a long-chain alcohol, preferably n-heptanol, in order not to form severe emulsion during re-use of the solvent for extraction of phosphoric acid as described earlier. The temperature of the water-immiscible solvent 5A is preferably below 60° C. since lower temperatures favor phosphoric acid extraction.

The liquid-liquid extraction section 10 is preferably configured for executing a continuous liquid-liquid extraction process using preferably liquid-liquid extraction equipment such as pulsed-columns. However, any other liquid-liquid extraction equipment can be used such as, agitated columns, non-agitated columns, mixer settlers, inline mixers, centrifugal contactors, etc. The raffinate 2, which is depleted in phosphate, is led to further treatment such as reuse for dissolution, etc. The water-immiscible solvent 3A which is loaded with phosphoric acid is optionally scrubbed with an aqueous solution to remove co-extracted impurities.

The phosphorus-loaded water immiscible liquid phase 3A is thereafter mixed with a recycled di-ammonium phosphate solution as strip solution 4A in the stripping section 20. As before, the stripping section 20 is preferably configured for a continuous liquid-liquid extraction process using preferably liquid-liquid extraction equipment such as a mixer settler. However, any other liquid-liquid extraction equipment can be used such as, pulsed-columns, agitated columns, non-agitated columns, inline mixers, centrifugal contactors, etc.

In contrast to stripping with a solution of mono-ammonium phosphate, which was found to be based on extraction equilibrium, stripping with a solution of di-ammonium phosphate is being based on conversion of phosphoric acid into a dissolved salt.

The reaction is believed to be the following:

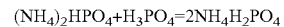

$$(NH_4)_2HPO_4 + H_3PO_4 = 2NH_4H_2PO_4$$

Since stripping with a di-ammonium phosphate solution is not based on extraction equilibrium, complete stripping can be obtained in a single contact stage. Therefore when using a di-ammonium phosphate solution for stripping, the preferred liquid-liquid extraction equipment is a single mixer settler unit.

Stripping of phosphoric acid from the loaded water-immiscible solvent according to the present embodiment is done with recycled di-ammonium phosphate solution 4A preferably in such a way that the solubility of mono-ammonium phosphate or di-ammonium phosphate is not exceeded. This enables to operate with only two phases during stripping in a mixer settler.

According to the present embodiment, stripping of phosphoric acid from the loaded water-immiscible solvent 3A is done with a solution of di-ammonium phosphate 4A by which precipitation of mono-ammonium phosphate or di-ammonium phosphate does not occur. It was found that by controlling the phase ratio of the solvent 3A to di-ammonium phosphate solution 4A during stripping to a certain level precipitation of mono-ammonium phosphate can be completely omitted. The phase ratio of solvent 3A to di-ammonium phosphate solution 4A in which precipitation of mono-ammonium phosphate does not occur depends on the phosphoric acid loading in the water-immiscible solvent 3A and the concentration of di-ammonium phosphate solution 4A. This means that the phase ratio preferably has to be adapted for each operational condition.

The ammonium phosphate solution, i.e. the input strip solution 4A, is in a test setup of this embodiment composed of recycled di-ammonium phosphate solution having a concentration of about 40 percent by weight and a pH of about 8.

Similar to stripping with a solution of mono-ammonium phosphate, stripping with a solution of di-ammonium phosphate can be used for increasing the concentration of phosphate in the strip solution 6 compared to the original concentration in the water-immiscible solvent 3A. This is done by having an organic to aqueous phase ratio larger than 1 during the stripping process. Generally, a higher concentration of di-ammonium phosphate 4A will enable a higher organic to aqueous phase ratio during stripping. A higher di-ammonium phosphate concentration can be obtained by operating at a higher temperature. The organic to aqueous phase ratio must not be increased to levels in which precipitation of mono-ammonium phosphate occurs during the stripping process.

The phase ratio is calculated for specific operational conditions and temperature according to the solubility of the ionic species involved. For a phosphoric acid loading in the water-immiscible solvent 3A of 1 molar and a di-ammonium phosphate concentration 4A of 4 molar, an organic to aqueous phase ratio of 2:1 is sufficient for not forming any precipitates.

Returning to FIG. 6, the strip solution 6 is composed of a mixture of $NH_4H_2PO_4$ and $(NH_4)_2HPO_4$. The ratio of $(NH_4)_2 HPO_4$ to $NH_4H_2PO_4$ in the obtained strip solution 6 is therefore important since sufficient amount of $(NH_4)_2 HPO_4$ is required in order not to form precipitates of monoammonium phosphate during the stripping process in the stripping section 20. The strip solution 6 is mixed with an ammonium phosphate slurry comprising $(NH_4)_3PO_4$ 51A. The pH in the mixing reactor 30 is typically maintained at about pH=8. The slurry 31A exiting the mixing reactor 30 is composed of $(NH_4)_2HPO_4$ crystals in a saturated $(NH_4)_2 HPO_4$ solution. The slurry 31A exiting the mixing reactor 30 is fed to the precipitate remover 40. In this embodiment, the precipitate remover 40 is configured for separating the precipitated di-ammonium phosphate crystals 44 from the di-ammonium phosphate solution 9A. Separation can be done by any solid-liquid separation technique such as filtration, settling, centrifugation, etc.

The separated crystals can be dried and/or granulated according to known processes forming a final di-ammonium phosphate product. The separated crystals can also be mixed with other ingredients such as nitrogen and potassium forming different fertilizer products.

The aqueous di-ammonium phosphate solution 9A exiting the precipitate remover 40 is split into two parts 4A and 72A. One part of the aqueous di-ammonium phosphate solution 4A is recycled back to the stripping section 20. A second part 72A of the aqueous di-ammonium phosphate solution is ammoniated by adding gaseous or liquid ammonia. Addition of ammonia to the aqueous di-ammonium phosphate solution 72A results in heat generation and formation of a slurry 73A. The heat of neutralization is removed by the heat exchanger 52. The ammoniated slurry 73A is composed of a mixture of $(NH_4)_2HPO_4$ and $(NH_4)_3PO_4$. Addition of ammonia should be proportional to the phosphate loading in the water immiscible solvent 3A. The cooled off slurry 51A is provided to the mixing reactor 30 as described further above.

In another embodiment, the input strip solution is a mixture of $NH_4H_2PO_4$ and $(NH_4)_2HPO_4$. The input strip solution has a ratio of N/P and a concentration of phosphate ions prohibiting crystals of monoammonium phosphate or diammonium phosphate to precipitate when brought in contact with the solvent loaded with phosphate in the stripping section. If the input strip solution mixture has more than 20% $(NH_4)_2HPO_4$, the solvent has to be a water-immiscible alcohol in order to avoid emulsion formation, as described further above. If the input strip solution mixture contains less than 20% $(NH_4)_2HPO_4$, any water-immiscible solvent can be used.

If the input strip solution has a ratio of N/P and a concentration of phosphate ions causing crystals of monoammonium phosphate to precipitate when brought in contact with the solvent loaded with phosphate in the stripping section, the stripping section has to be designed as a three phase stripping section. The precipitate remover is then configured for separating the crystals of monoammonium phosphate from the loaded strip solution exiting the stripping section. This is typically the situation when only $(NH_4)_2HPO_4$ is used in the input strip solution. In such a case, a water-immiscible alcohol has to be used as solvent.

When the input strip solution is a mixture of $NH_4H_2PO_4$ and $(NH_4)_2HPO_4$, the arrangement preferably comprises a mixing control unit, configured to control the composition of the input strip solution 4.

Figure 7:
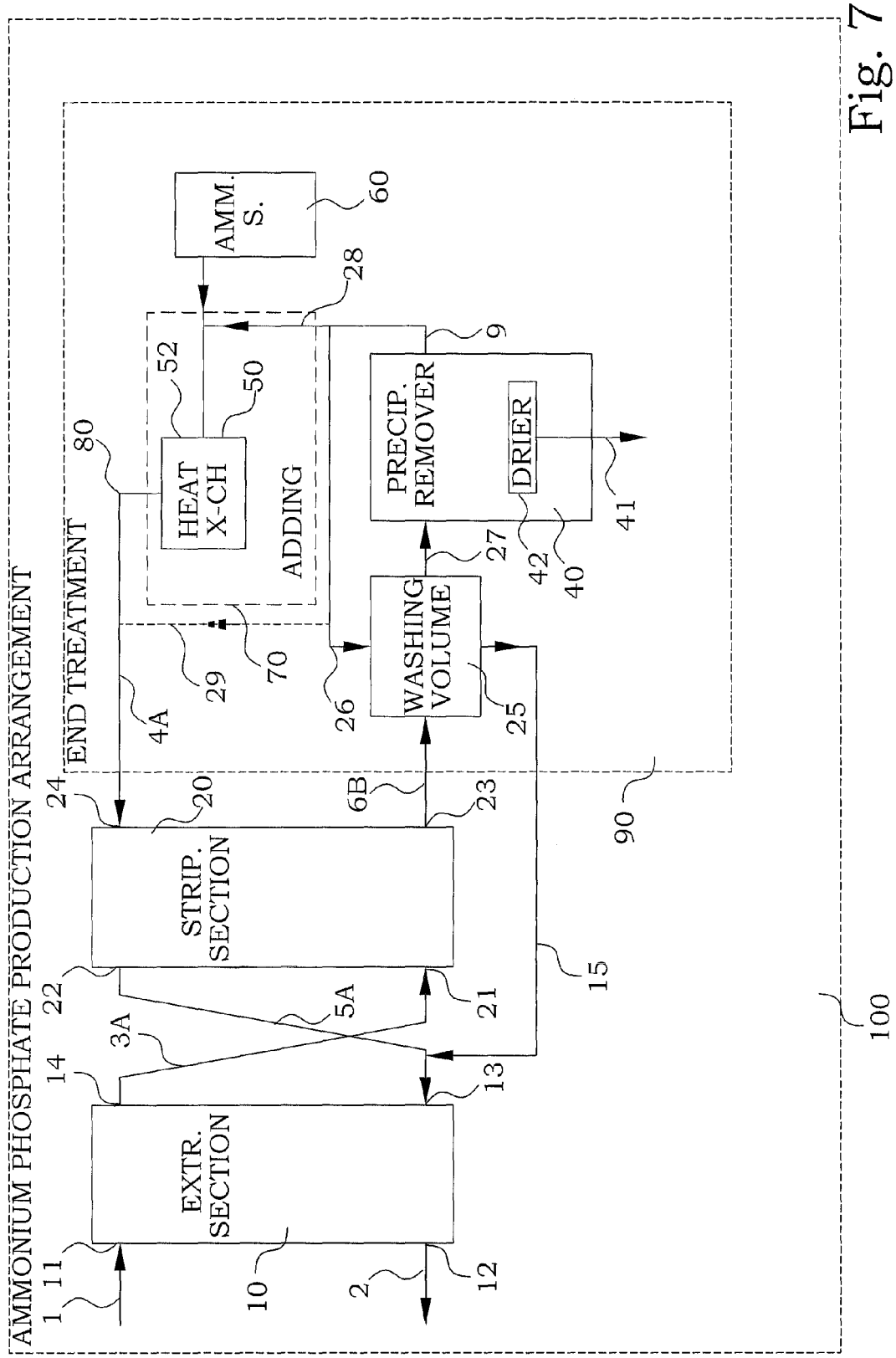
FIG. 7 is a block scheme of another embodiment of an arrangement for production of mono-ammonium phosphate.

Another embodiment which enables production of monoammonium phosphate is illustrated in FIG. 7. In this embodiment the strip solution 4A is composed of $(NH_4)_2 HPO_4$ and the water-immiscible solvent 3A is composed of a long change alcohol such as n-heptanol in order not to form emulsions during reuse of the solvent for extraction of phosphoric acid as discussed earlier.

The loaded water-immiscible solvent 3A is stripped with the strip solution 4A and results in formation of three phases; stripped solvent 5A, loaded strip solution and precipitated $NH_4H_2PO_4$ crystals. The stripped solvent 5A is separated and is reused for extraction of phosphoric acid. The aqueous phase leaving the stripping section, i.e. the strip solution 6B is now composed of the $NH_4H_2PO_4$ crystals in saturated $NH_4H_2PO_4$ solution. A small problem with this embodiment is that the so formed $NH_4H_2PO_4$ crystals contain too high levels of residual solvent. In order to remove such residual solvent, the strip solution 6B is mixed with recycled monoammonium phosphate solution 26 in a washing volume 25. This washing enables separation of residual solvent at a higher aqueous to organic phase ratio and the residual solvent can be re-cycled into the extraction section 10. The slurry of $NH_4H_2PO_4$ crystals in saturated $NH_4H_2PO_4$ solution 27 after separation of residual solvent 15 is fed to the precipitate remover 40. In the precipitate remover 40 monoammonium phosphate crystals 41 are separated from the mother liquid.

A first part 28 of the separated mono-ammonium phosphate solution 9 is provided to the adding arrangement 70 for being ammoniated by addition of ammonia from the source of ammonia 60. A solution composed of $(NH_4)_2HPO_4$ 4A is formed. Also this neutralization reaction generates heat, which is cooled off by the heat exchanger 52 of the cooling arrangement 50. After cooling in heat exchanger 52, the di-ammonium phosphate solution 4A is reused for stripping.

A second part 26 of the separated mono-ammonium phosphate solution 9 is reused for separation of residual solvent, as was described here above.

The three phase stripping section is also applicable in systems where a mixture of $NH_4H_2PO_4$ and $(NH_4)_2HPO_4$ is used as input strip solution, and where the ratio of N/P and the concentration of phosphate ions causing crystals of monoammonium phosphate to precipitate when brought in contact with the solvent loaded with phosphate in the stripping section. If the molar amount of $NH_4H_2PO_4$ is equal or larger than 4 times the molar amount of $(NH_4)_2HPO_4$, any water-immiscible solvent can be used, e.g. tributyl phosphate in a suitable diluent. Otherwise, a water-immiscible alcohol has to be used as solvent. In other words, the loaded water-immiscible solvent 3a is stripped with a strip solution 4A composed of a mixture of $NH_4H_2PO_4$ and $(NH_4)_2HPO_4$ in which the molar concentration of $NH_4H_2PO_4$ is $\geq 80\%$ in relation to total molar phosphate if a non-alcohol is utilized as solvent. The stripping process results in formation of three phases.

Minor changes may then be made to the arrangement. These are indicated with dotted lines in FIG. 7. To this end, a third part 29 of the separated mono-ammonium phosphate solution 9 is allowed to short-cut the adding arrangement, which means that after cooling in heat exchanger 52, the di-ammonium phosphate solution is mixed with the third part 29 of the separated mono-ammonium phosphate solution, forming a solution 4A composed of a mixture of $NH_4H_2PO_4$ and $(NH_4)_2HPO_4$. Preferably, the adding arrangement comprises an adding control configured to add a stream of the strip solution direct from the outlet of the precipitate remover 40 with a stream of the solution comprising diammonium phosphate from the heat exchanger 52 to obtain the required N/P ratio at the stripping section 20.

As mentioned above, in case the molar concentration of $NH_4H_2PO_4$ is ≥80% in relation to total molar phosphate which is reused for stripping, the solvent may be a non-alcohol solvent. In such a case, the problems with residual solvent in the mono-ammonium phosphate crystals are significantly reduced and the provision of the washing of the crystals can thereby be omitted.

Figure 8:
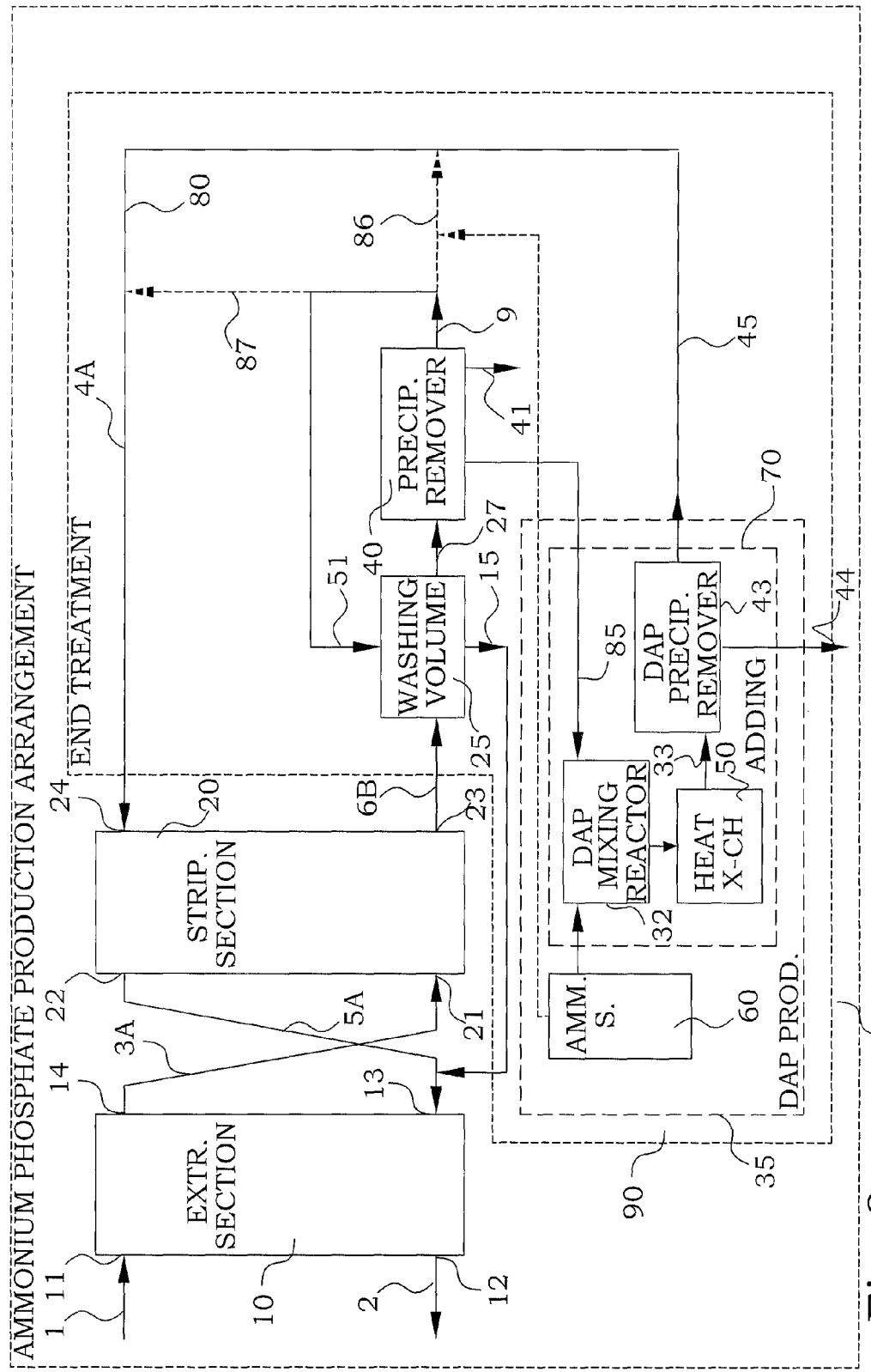
FIG. 8 is a block scheme of yet another embodiment of an arrangement for production of both mono-ammonium phosphate and di-ammonium phosphate.

The use of a three phase stripping section 20 can also be combined with production of either or both of MAP and DAP. One embodiment is illustrated in FIG. 8. A slurry 85 of monoammonium phosphate crystals in a saturated monoammonium solution is taken from the precipitate remover 40 and entered into a DAP mixing reactor 32. Ammonia is added and the neutralization heat is cooled off, in analogy with the embodiment of FIG. 3. However, in the embodiment of FIG. 8, the diammonium phosphate solution 45 from the DAP precipitate remover 43 is here instead returned to be used as strip solution. If the amount of diammonium phosphate crystals is too low to maintain the input strip solution, a stream of monoammonium phosphate 86 can be taken from the precipitate remover 40, and ammonia can be added for turning the solution into a diammonium phosphate solution. Optionally, a cooling arrangement could be connected also to such a stream.

If the strip solution is composed of a mixture of $NH_4H_2PO_4$ and $(NH_4)_2HPO_4$, a part 87 of the monoammonium phosphate solution from the precipitate remover 40 can be mixed into the input strip solution without passing the adding arrangement 70. Also here, an adding control can be provided and configured to add a stream of the strip solution direct from the outlet of the precipitate remover 40 with a stream of the solution comprising diammonium phosphate to obtain the required N/P ratio at the stripping section 20.

If the solvent is a non-alcohol, the arrangement for washing the crystals can also be omitted.

The embodiments described above are to be understood as a few illustrative examples of the present invention. It will be understood by those skilled in the art that various modifications, combinations and changes may be made to the embodiments without departing from the scope of the present invention. For example, parallel production of both mono-ammonium phosphate and di-ammonium phosphate according to the principles described above, production of di-ammonium phosphate by reacting tri-ammonium phosphate slurry with a strip solution composed of mono-ammonium phosphate and phosphoric acid, and production of di-ammonium phosphate in combination with stripping with a di-ammonium phosphate solution in which the intermediate is mono-ammonium phosphate. The scope of the present invention is, however, defined by the appended claims.

The invention claimed is:

1. An arrangement for production of pure ammonium phosphates, comprising:
    a solvent having a solubility in water of less than 2%;
    a feed liquid comprising phosphoric acid and essentially free from nitrate ions;
    an extraction section, configured for performing a liquid-liquid extraction of phosphate between the feed liquid comprising phosphoric acid and the solvent;
    said extraction section having a first extraction inlet for provision of said feed liquid, a second extraction inlet for provision of said solvent, a first extraction outlet for delivering said feed liquid at least partly depleted in phosphate and a second extraction outlet for delivering said solvent loaded with phosphate;
    an aqueous ammonium phosphate strip solution;
    a stripping section configured for performing a liquid-liquid extraction of phosphate between said solvent loaded with phosphate and the strip solution;
    said stripping section having a first stripping inlet, connected to said second extraction outlet, for provision of said solvent loaded with phosphate, a second stripping inlet for provision of input strip solution, a first stripping outlet for delivering said solvent at least partly depleted in phosphate and a second stripping outlet for delivering output strip solution;
    said first stripping outlet being connected to said second extraction inlet for recirculating said solvent at least partly depleted in phosphate for further extraction of phosphate;
    wherein at least one of:
        at least 80% of said ammonium phosphate in said input strip solution is monoammonium phosphate; and
        said solvent is a water-immiscible alcohol;
    a source of ammonia comprised in end treatment arrangements connected to said second stripping outlet;
    an adding arrangement connected to said source of ammonia;
    a cooling arrangement configured for cooling off heat generated when said ammonia from said source of ammonia is added into said at least a partial stream of said strip solution;
    a precipitate remover configured for separating crystals from said output strip solution;
    said adding arrangement being configured for adding ammonia from said source of ammonia into at least a partial stream of said strip solution before or after said precipitate remover; and
    a recirculating system connected between said outlet from said precipitate remover and said second stripping inlet of said stripping section, said recirculating system being configured for reusing strip solution from said precipitate remover as input strip solution.

2. The arrangement according to claim 1, wherein at least 80% of said ammonium phosphate in said input strip solution is monoammonium phosphate.

3. The arrangement according to claim 1, wherein all said ammonium phosphate in said input strip solution is monoammonium phosphate, the arrangement further comprising a diammonium phosphate supplying arrangement and a mixing reactor, said mixing reactor being connected to said second stripping outlet of said stripping section and said diammonium phosphate supplying arrangement and being configured for mixing a diammonium phosphate solution into at least a part stream of said output strip solution from said stripping section;
    wherein said cooling arrangement is configured for maintaining a temperature of said output strip solution below a saturation temperature for monoammonium phosphate, whereby crystals of monoammonium phosphate are caused to precipitate from a saturated monoammonium phosphate solution; and
    wherein said precipitate remover is configured for separating said crystals of monoammonium phosphate.

4. The arrangement according to claim 3, wherein
said diammonium phosphate supplying arrangement comprises said adding arrangement;
said adding arrangement comprises an inlet connected to said precipitate remover for supply of a partial stream of said strip solution;
said adding arrangement is configured for adding said ammonia from said source of ammonia into said partial stream of said strip solution forming a solution comprising diammonium phosphate; and
said adding arrangement is further configured for returning said solution comprising diammonium phosphate to said diammonium phosphate mixing reactor.

5. The arrangement according to claim 4, further comprising a diammonium phosphate production portion configured for adding ammonia to a stream originating from said output strip solution comprising monoammonium phosphate, causing crystals of diammonium phosphate to precipitate from a saturated diammonium phosphate solution.

6. The arrangement according to claim 1, wherein said solvent is a water-immiscible alcohol.

7. The arrangement according to claim 2, further comprising
a mixing control unit, configured to control the composition of said input strip solution;
wherein said mixing control unit is configured to control said input strip solution to have a ratio of N/P and a concentration of phosphate ions prohibiting crystals of monoammonium phosphate or diammonium phosphate to precipitate when brought in contact with said solvent loaded with phosphate in said stripping section.

8. The arrangement according to claim 2, further comprising
a mixing control unit, configured to control the composition of said input strip solution;
wherein said mixing control unit is configured to control said input strip solution to have a ratio of N/P and a concentration of phosphate ions causing crystals of monoammonium phosphate to precipitate when brought in contact with said solvent loaded with phosphate in said stripping section;
whereby said stripping section is a three phase stripping section;
said precipitate remover being configured for separating said crystals of monoammonium phosphate from said output strip solution exiting said stripping section.

9. The arrangement according to claim 8, wherein
said adding arrangement is configured for adding ammonia from said source of ammonia into a partial stream of said strip solution, forming a solution comprising diammonium phosphate;
said adding arrangement comprises said cooling arrangement;
said adding arrangement further comprises said mixing control; and
said mixing control is configured to mix a stream of said strip solution direct from said outlet of said precipitate remover with a stream of said solution comprising diammonium phosphate to obtain said N/P ratio.

10. The arrangement according to claim 6, wherein all said ammonium phosphate in said input strip solution is diammonium phosphate;
said arrangement comprising:
an input strip solution flow control, configured to provide a flow of said input strip solution sufficient to strip said phosphate from said solvent without causing any precipitation of crystals; and
a triammonium phosphate supplying arrangement configured for mixing a triammonium phosphate slurry into a stream of said output strip solution from said stripping section;
wherein said cooling arrangement is configured for maintaining a temperature of said output strip solution below a saturation temperature for diammonium phosphate, whereby crystals of diammonium phosphate are caused to precipitate from a saturated diammonium phosphate solution;
said precipitate remover being configured for separating said crystals of diammonium phosphate.

11. The arrangement according to claim 6, further comprising
an input strip solution flow control, configured to provide a flow of said input strip solution low enough to cause monoammonium phosphate to precipitate when said input strip solution is brought in contact with said solvent loaded with phosphate in said stripping section;
whereby said stripping section is a three phase stripping section;
said precipitate remover is configured for separating said crystals of monoammonium phosphate from said output strip solution exiting said stripping section; and
a washing volume, connected to said second outlet of said stripping section and configured for washing said precipitated crystals of monoammonium phosphate in said strip solution exiting said stripping section by monoammonium phosphate solution from said outlet from said precipitate remover.

12. The arrangement according to claim 1, wherein said adding arrangement is configured to add an amount of substance of ammonia to said adding arrangement in dependence of an amount of substance of stripped phosphate in said strip solution exiting said second stripping outlet of said stripping section.

13. The arrangement according to claim 6, further comprising
a mixing control unit, configured to control the composition of said input strip solution;
wherein said mixing control unit is configured to control said input strip solution to have a ratio of N/P and a concentration of phosphate ions prohibiting crystals of monoammonium phosphate or diammonium phosphate to precipitate when brought in contact with said solvent loaded with phosphate in said stripping section.

14. The arrangement according to claim 6, further comprising
a mixing control unit, configured to control the composition of said input strip solution;
wherein said mixing control unit is configured to control said input strip solution to have a ratio of N/P and a concentration of phosphate ions causing crystals of monoammonium phosphate to precipitate when brought in contact with said solvent loaded with phosphate in said stripping section;
whereby said stripping section is a three phase stripping section;
said precipitate remover being configured for separating said crystals of monoammonium phosphate from said output strip solution exiting said stripping section.

15. The arrangement according to claim 1, wherein the solvent has a solubility in water of less than 1%.

16. A method for production of pure ammonium phosphates, comprising the steps of:
extracting phosphate from a feed liquid comprising phosphoric acid by a liquid-liquid extraction into a solvent;

said solvent having a solubility in water of less than 2%;
said feed liquid being essentially free from nitrate ions;
  stripping said solvent of at least a part of said phosphate by a liquid-liquid extraction into a strip solution;
said strip solution being an aqueous ammonium phosphate solution;
  separating said strip solution loaded with stripped phosphate and said solvent at least partially depleted in phosphate;
  recirculating said solvent at least partly depleted in phosphate for further extraction of phosphate in said step of extracting;
wherein at least one of:
  at least 80% of said ammonium phosphate in said input strip solution is monoammonium phosphate; and
  said solvent is a water-immiscible alcohol;
  adding ammonia into at least a partial stream comprising said strip solution;
  cooling off heat generated when said ammonia is added into said at least a partial stream of said strip solution;
  removing crystals from said loaded strip solution;
  said at least a partial stream into which ammonia is added is at least a partial stream of said strip solution before or after said step of removing crystal; and
  recirculating said strip solution after said step of removing crystals for use as input strip solution in said step of stripping.

17. The method according to claim 16, wherein at least 80% of said ammonium phosphate in said strip solution is monoammonium phosphate.

18. The method according to claim 17, wherein all said ammonium phosphate in said strip solution is monoammonium phosphate, and comprising the further steps of:
  mixing a diammonium phosphate solution into at least a part stream of said strip solution loaded with stripped phosphate;
  maintaining a temperature of said loaded strip solution below a saturation temperature for monoammonium phosphate; and
  causing crystals of monoammonium phosphate to precipitate from a saturated monoammonium phosphate solution;
  said step of removing crystals comprising separating said crystals of monoammonium phosphate.

19. The method according to claim 18, comprising the further steps of:
  adding said ammonia into said partial stream of said strip solution, forming a solution comprising diammonium phosphate; and
  returning said solution comprising diammonium phosphate to said strip solution loaded with stripped phosphate.

20. The method according to claim 16, wherein said solvent is a water-immiscible alcohol.

21. The method according to claim 17, comprising the further step of controlling the composition of said strip solution.

22. The method according to claim 16, wherein said step of adding is performed to add an amount of substance of ammonia in dependence of an amount of substance of stripped phosphate in said strip solution after said stripping.

23. The method according to claim 20, comprising the further step of controlling the composition of said strip solution.

24. The method according to claim 16, wherein the solvent has a solubility in water of less than 1%.

* * * * *

UNITED STATES PATENT AND TRADEMARK OFFICE
CERTIFICATE OF CORRECTION

PATENT NO. : 9,738,522 B2
APPLICATION NO. : 14/409131
DATED : August 22, 2017
INVENTOR(S) : Cohen et al.

Page 1 of 1

It is certified that error appears in the above-identified patent and that said Letters Patent is hereby corrected as shown below:

In the Claims

Claim 3, Column 28, Line 50, change "claim 1" to --claim 2--.

Claim 16, Columns 30-31, delete in its entirety and replace with the following claim 16:
16. A method for production of pure ammonium phosphates, comprising the steps of:
　　extracting phosphate from a feed liquid comprising phosphoric acid by a liquid-liquid extraction into a solvent;
　　　　said solvent having a solubility in water of less than 2%;
　　　　said feed liquid being essentially free from nitrate ions;
　　stripping said solvent of at least a part of said phosphate by a liquid-liquid extraction into a strip solution;
　　　　said strip solution being an aqueous ammonium phosphate solution;
　　separating said strip solution loaded with stripped phosphate and said solvent at least partially depleted in phosphate;
　　recirculating said solvent at least partly depleted in phosphate for further extraction of phosphate in said step of extracting;
　　　　wherein at least one of:
　　　　　　at least 80% of said ammonium phosphate in said strip solution is monoammonium phosphate; and
　　　　　　said solvent is a water-immiscible alcohol;
　　adding ammonia into at least a partial stream comprising said strip solution;
　　cooling off heat generated when said ammonia is added into said at least a partial stream of said strip solution so as to form a loaded strip solution;
　　removing crystals from said loaded strip solution;
　　　　said at least a partial stream into which ammonia is added is at least a partial stream of said strip solution before or after said step of removing crystals; and
recirculating said strip solution after said step of removing crystals for use as input strip solution in said step of stripping.

Signed and Sealed this
Ninth Day of January, 2018

Joseph Matal
*Performing the Functions and Duties of the
Under Secretary of Commerce for Intellectual Property and
Director of the United States Patent and Trademark Office*